(12) United States Patent
Reddi et al.

(10) Patent No.: US 12,271,810 B2
(45) Date of Patent: Apr. 8, 2025

(54) FEDERATED LEARNING WITH ADAPTIVE OPTIMIZATION

(71) Applicant: Google LLC, Mountain View, CA (US)

(72) Inventors: Sashank Jakkam Reddi, Jersey City, NJ (US); Sanjiv Kumar, Jericho, NY (US); Manzil Zaheer, Mountain View, CA (US); Zachary Burr Charles, Seattle, WA (US); Zachary Alan Garrett, Seattle, WA (US); John Keith Rush, Seattle, WA (US); Jakub Konecny, Edinburgh (GB); Hugh Brendan McMahan, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 1096 days.

(21) Appl. No.: 17/100,253

(22) Filed: Nov. 20, 2020

(65) Prior Publication Data

US 2021/0073639 A1    Mar. 11, 2021

Related U.S. Application Data

(63) Continuation-in-part of application No. 17/014,139, filed on Sep. 8, 2020, now Pat. No. 11,775,823, which
(Continued)

(51) Int. Cl.
| | |
|---|---|
| *G06N 3/08* | (2023.01) |
| *G06N 3/04* | (2023.01) |
| *G06N 3/045* | (2023.01) |

(52) U.S. Cl.
CPC ............... *G06N 3/08* (2013.01); *G06N 3/045* (2023.01)

(58) Field of Classification Search
CPC .......... G06N 3/08; G06N 3/0895; G06N 3/09; G06N 3/091; G06N 3/092; G06N 3/094;
(Continued)

(56) References Cited

U.S. PATENT DOCUMENTS

| | | |
|---|---|---|
| 9,723,144 B1 | 8/2017 | Gao et al. |
| 10,860,920 B2 | 12/2020 | Gendron-Bellemare et al. |

(Continued)

FOREIGN PATENT DOCUMENTS

WO    WO-2020005240 A1 *   1/2020   ......... G06F 16/9536

OTHER PUBLICATIONS

Kingma et al., "ADAM: A Method for Stochastic Optimization", Jan. 20, 2017, ICLR Conference 2015, pp. 1-15 (Year: 2015).*
(Continued)

*Primary Examiner* — Paulinho E Smith
(74) *Attorney, Agent, or Firm* — DORITY & MANNING P.A.

(57) ABSTRACT

A computing system and method can be used to implement a version of federated learning (FL) that incorporates adaptivity (e.g., leverages an adaptive learning rate). In particular, the present disclosure provides a general optimization framework in which (1) clients perform multiple epochs of training using a client optimizer to minimize loss on their local data and (2) a server system updates its global model by applying a gradient-based server optimizer to the average of the clients' model updates. This framework can seamlessly incorporate adaptivity by using adaptive optimizers as client and/or server optimizers. Building upon this general framework, the present disclosure also provides example specific adaptive optimization techniques for FL which use per-coordinate methods as server optimizers. By focusing on adaptive server optimization, the use of adaptive learning rates is enabled without increase in client storage or com-
(Continued)

munication costs and compatibility with cross-device FL can be ensured.

17 Claims, 7 Drawing Sheets

Related U.S. Application Data is a continuation of application No. 16/657,356, filed on Oct. 18, 2019, now Pat. No. 10,769,529.

(60) Provisional application No. 62/775,016, filed on Dec. 4, 2018.

(58) Field of Classification Search
CPC ...... G06N 3/096; G06N 3/098; G06N 3/0985; G06N 3/045; G06N 3/0455
See application file for complete search history.

(56) References Cited

U.S. PATENT DOCUMENTS

| | | | |
|---|---|---|---|
| 10,984,308 B2 | 4/2021 | Li et al. | |
| 11,785,073 B2* | 10/2023 | Suresh | H03M 7/3082 706/12 |
| 2017/0161640 A1 | 6/2017 | Shamir | |
| 2018/0075347 A1 | 3/2018 | Alistarh et al. | |
| 2018/0107926 A1 | 4/2018 | Choi et al. | |
| 2019/0227980 A1* | 7/2019 | McMahan | G06N 3/044 |
| 2020/0012936 A1 | 1/2020 | Lee et al. | |
| 2020/0104706 A1* | 4/2020 | Sandler | G06N 3/045 |
| 2021/0117780 A1* | 4/2021 | Malik | G10L 15/063 |
| 2022/0101131 A1* | 3/2022 | Taherzadeh Boroujeni | G06N 3/084 |
| 2022/0116764 A1* | 4/2022 | Pezeshki | H04W 72/20 |
| 2022/0129786 A1* | 4/2022 | da Silva | G06N 20/00 |
| 2022/0414464 A1* | 12/2022 | Krishnaswamy | G06N 3/047 |
| 2023/0098885 A1* | 3/2023 | Feuz | G06F 9/547 706/12 |

OTHER PUBLICATIONS

McMahan, "Federated Learning of Deep Networks using Model Averaging", Feb. 17, 2016, arXIV.com, p. 111 (Year: 2016).*
Agarwal et al., "Finding Approximate Local Minima for Nonconvex Optimization in Linear Time", arXiv:1611.01146v2, Nov. 4, 2016, 27 pages.
Allen-Zhu et al., "Variance Reduction for Faster Non-Convex Optimization", International Conference on Machine Learning, Jun. 19-24, 2016, New York City, NY, 9 pages.
Ba et al., "Layer Normalization", arXiv:1607.06450v1, Jul. 21, 2016, 14 pages.
Basu et al., "Qsparse-local-SGD: Distributed SGD with Quantization, Sparsification, and Local Computations", arXiv:1906.02367v2, Nov. 2, 2019, 50 pages.
Bernstein et al., "SignSGD: Compressed Optimisation for Non-Convex Problems", arXiv:1802.04434v3, Aug. 7, 2018, 25 pages.
Bonawitz et al., "Towards Federated Learning at Scale: System Design", Conference on Systems and Machine Learning (SysML), Mar. 31-Apr. 2, 2019, Stanford, CA, 15 pages.
Caldas et al., "Leaf: A Benchmark for Federated Settings", arXiv:1812.01097v1. Dec. 3, 2018, 6 pages.
Carmon et al., "Accelerated Methods for Non-Convex Optimization", arXiv:1611.00756v2, Feb. 2, 2017, 24 pages.
Charles et al., "On the Outsized Importance of Learning Rates in Local Update Methods", arXiv:2007.00878v1, Jul. 2, 2020, 69 pages.
Chiu et al., "Named Entity Recognition with Bidirectional LSTM-CNNs", arXiv:1511.08308v5, Jul. 19, 2016, 14 pages.
Clark, "Semi-Supervised Learning for NLP", Stanford University, Lecture 17, 77 pages.
Cohen et al., "EMNIST: an extension of MNIST to handwritten letter", arXiv: 1702.05373v2, Mar. 1, 2017, 10 pages.
Defazio et al., "On the Ineffectiveness of Variance Reduced Optimization for Deep Learning", arXiv:1812.04529v1, Dec. 11, 2018, 10 pages.
Defazio et al., "SAGA: A Fast Incremental Gradient Method With Support for Non-Strongly Convex Composite Objectives", Conference on Neural Information Processing Systems, Dec. 8-13, 2014, Montreal, Canada, 9 pages.
Duchi et al., "Adaptive Subgradient Methods for Online Learning and Stochastic Optimization", Journal of Machine Learning Research, vol. 12, Jul. 2011, pp. 2121-2159.
Ghadimi et al., "Mini-Batch Stochastic Approximation Methods for Nonconvex Stochastic Composite Optimization", arXiv:1308.6594v2, Sep. 5, 2013, 33 pages.
Ghadimi et al., "Stochastic First- and Zeroth-Order Methods for Nonconvex Stochastic Programming", arXiv:1309.5549v1, Sep. 22, 2013, 25 pages.
Goyal et al., "Accurate, Large Minibatch SGD: Training ImageNet in 1 Hour", arXiv:1706.02677v1, Jun. 8, 2017, 12 pages.
Hazan et al., "Beyond Convexity: Stochastic Quasi-Convex Optimization", arXiv:1507.02030v3, Oct. 28, 2015, 23 pages.
He et al., "Deep Residual Learning for Image Recognition", Conference on Computer Vision and Pattern Recognition, Jun. 26-Jul. 1, 2016, Las Vegas, Nevada, 9 pages.
Hinton et al., "Reducing the Dimensionality of Data with Neural Networks", Science, vol. 313, Jul. 28, 2006, pp. 504-507.
Hsieh et al., "The Non-IID Data Quagmire of Decentralized Machine Learning", arXiv: 1910.00189v1, Oct. 2, 2019, 18 pages.
Hsu et al., "Measuring the Effects of Non-Identical Data Distribution for Federated Visual Classification", arXiv:1909.06335v1, Sep. 13, 2019, 5 pages.
Huang et al., "Densely Connected Convolutional Networks", arXiv:1608.06993v5, Jan. 28, 2018, 9 pages.
Ingerman et al., "Introducing TensorFlow Federated", Mar. 6, 2019, https://medium.com/tensorflow/introducing-tensorflow-federated-a4147aa20041, Retrieved on May 24, 2021, 5 pages.
Jin et al., "How to Escape Saddle Points Efficiently", arXiv:1703.00887v1, Mar. 2, 2017, 35 pages.
Johnson et al., "Accelerating Stochastic Gradient Descent using Predictive Variance Reduction", Conference on Neural Information Processing Systems, Dec. 5-10, 2013, Lake Tahoe, NV, 9 pages.
Kairouz et al., "Advances and Open Problems in Federated Learning", arXiv:1912.04977v1, Dec. 10, 2019. 105 pages.
Karimireddy et al., "SCAFFOLD: Stochastic Controlled Averaging for On-Device Federated Learning", arXiv:1910.06378v1, Oct. 14, 2019, 30 pages.
Keskar et al., "Improving Generalization Performance by Switching from Adam to SGD", arXiv:1712.07628v1, Dec. 20, 2017.
Khaled et al., "First Analysis of Local GD on Heterogeneous Data", arXiv:1909.04715v2, Mar. 18, 2020, 11 pages.
Krizhevsky et al., "Learning Multiple Layers of Features from Tiny Images", Technical Report, Citeseer. Apr. 8, 2009, 60 pages.
Li et al., "Federated Learning: Challenges, Methods, and Future Directions", arXiv:1908.07873v1, Aug. 21, 2019, 21 pages.
Li et al., "On the Convergence of FedAvg on Non-IID Data", arXiv:1907.02189v2, Oct. 8, 2019, 26 pages.
Li et al., "On the Convergence of Stochastic Gradient Descent with Adaptive Stepsizes", arXiv:1805.08114v2, May 31, 2018, 13 pages.
Li et al., "Pachinko Allocation: DAG-Structured Mixture Models of Topic Correlations", International Conference on Machine Learning, Jun. 25-29, 2006, Pittsburgh, Pennsylvania, 9 pages.
Li et al., "Stochastic Variance Reduced Optimization for Nonconvex Sparse Learning", Jun. 19-24, 2016, New York City, NY, 9 pages.
Luo et al., "Adaptive Gradient Methods with Dynamic Bound of Learning Rate", International Conference on Learning Representations, May 6-9, 2019, New Orleans, LA, 21 pages.
Luong et al., "Stanford Neural Machine Translation Systems for Spoken Language Domain", International Workshop on Spoken Language Translation, Dec. 3-4, 2015, Da Nang, Vietnam, 4 pages.
Ma et al., "End-to-End Sequence Labeling via Bi-directional LSTM-CNNs-CRF", arXiv:1603.01354v5, May 29, 2016, 12 pages.

(56) References Cited

OTHER PUBLICATIONS

Martens et al., "Deep learning via Hessian-free optimization", Conference on Learning Theory, Jun. 27-29, 2010, Haifa, Israel, 8 pages.

Martens et al., "Optimizing Neural Networks with Kronecker-factored Approximate Curvature", arXiv:1503.05671v7, Jun. 8, 2020, 58 pages.

McMahan et al., "Adaptive Bound Optimization for Online Convex Optimization", Conference on Learning Theory, Jun. 27-29, 2010, Haifa, Israel, 15 pages.

McMahan et al., "Communication-Efficient Learning of Deep Networks from Decentralized Data", International Conference on Artificial Intelligence and Statistics (AISTATS), Apr. 20-22, 2017, Ft. Lauderdale, FL, 10 pages.

Nesterov. "Introductory Lectures on Convex Optimization: A Basic Course", Applied Optimization, vol. 87, Kluwer Academic Publishers, Massachusetts, 2004, 253 pages.

Reddi et al., "A Generic Approach for Escaping Saddle points", arXiv:1709.01434v1, Sep. 5, 2017, 18 pages.

Reddi et al., "Fast Incremental Method for Nonconvex Optimization", arXi:1603.06159v1, Mar. 19, 2016, 14 pages.

Reddi et al., "Fast Stochastic Methods for Nonsmooth Nonconvex Optimization", arXiv:1605.06900v1, May 23, 2016, 24 pages.

Reddi et al., "Stochastic Variance Reduction for Nonconvex Optimization", arXiv:1603.06160v2, Apr. 4, 2016, 26 pages.

Robbins et al., "A Stochastic Approximation Method", The Annals of Mathematical Statistics, vol. 22, No. 3, Sep. 1951, pp. 400-407.

Sahu et al., "On the Convergence of Federated Optimization in Heterogeneous Networks", arXiv:1812.06127v1, Dec. 14, 2018, 12 pages.

Sennrich et al., "Neural Machine Translation of Rare Words with Subword Units", arXiv:1508.07909v5, Jun. 10, 2016, 11 pages.

Stefan, "Neural Machine Translation system for English to Vietnamese", https://github.com/stefan-it/nmt-en-vi, retrieved on May 27, 2021, 5 pages.

Stich et al., "The Error-Feedback Framework: Better Rates for SGD with Delayed Gradients and Compressed Communication", arXiv:1909.05350v1, Sep. 11, 2019, 29 pages.

Stich, "Local SGD Converges Fast and Communicates Little", International Conference on Learning Representations, May 6-9, 2019, New Orleans, LA, 17 pages.

Sutskever et al., "On the importance of initialization and momentum in deep learning", International Conference on Machine Learning, Jun. 16-23, 2013, Atlanta, GA, 9 pages.

Szegedy et al., "Inception-v4, Inception-ResNet and the Impact of Residual Connections on Learning", arXiv:160207261v2, Aug. 23, 2016, 12 pages.

TensorFlow Federated Authors, "TensorFlow Federated Stack Overflow dataset", 2019, https://www.tensorflow.org/federated/api_docs/python/tff/simulation/datasets/stackoverflow/load_data, Retrieved on May 24, 2021, 3 pages.

Tieleman et al., "RmsProp: Divide the Gradient by a Running Average of its Recent Magnitude", COURSERA: Neural Networks for Machine Learning, vol. 4, Issue 2, Oct. 2012, pp. 26-31.

Tong et al., "Effective Federated Adaptive Gradient Methods with Non-IID Decentralized Data", arXiv:2009.06557v2, Dec. 22, 2020, 42 pages.

Vaswani et al., "Attention is All you Need", Conference on Neural Information Processing Systems, Dec. 4-9, 2017, Long Beach, California, 11 pages.

Vinyals et al., "Krylov Subspace Descent for Deep Learning", arXiv:1111.4259v1, Nov. 18, 2011, 11 pages.

Wang et al., "Adaptive Federated Learning in Resource Constrained Edge Computing Systems", arXiv:1804.05271v3, Feb. 17, 2019, 20 pages.

Wang et al., "Cooperative SGD: A unified Framework for the Design and Analysis of Communication-Efficient SGD Algorithms", arXiv:1808.07576v2, Oct. 19, 2018, 23 pages.

Wang et al., "Cross-Type Biomedical Named Entity Recognition with Deep Multi-Task Learning", arXiv:1801.09851v4, Oct. 8, 2018, 7 pages.

Ward et al., "AdaGrad stepsizes: Sharp convergence over nonconvex landscapes, from any initialization", arXiv:1806.01811v5, Jun. 21, 2018, 17 pages.

Wu et al., "3D ShapeNets: A Deep Representation for Volumetric Shapes", Conference on Computer Vision and Pattern Recognition, Jun. 7-12, 2015, Boston, Massachusetts, 9 pages.

Wu et al., "Global Convergence of Adaptive Gradient Methods for an Over-parameterized Neural Network", arXiv:1902.07111v2, Oct. 19, 2019, 27 pages.

Wu et al., "Group Normalization", European Conference on Computer Vision, Sep. 8-14, 2018, Munich, Germany, 17 pages.

Xie et al., "Local AdaAlter: Communication-Efficient Stochastic Gradient Descent with Adaptive Learning Rates", arXiv:1911.09030v1, Nov. 20, 2019, 18 pages.

Yu et al., "Parallel Restarted SGD with Faster Convergence and Less Communication: Demystifying Why Model Averaging Works for Deep Learning", AAAI Conference on Artificial Intelligence, Jan. 27-Feb. 1, 2019, Honolulu, Hawaii, pp. 5693-5700.

Zaheer et al., "Deep Sets", arXiv:1703.06114v3, Apr. 14, 2018, 29 pages.

Zeiler, "Adadelta: An Adaptive Learning Rate Method", arXiv:1212.5701v1, Dec. 22, 2012, 6 pages.

Zhang et al., "Lookahead Optimizer: k steps forward, 1 step back", Conference on Neural Information Processing Systems, Dec. 8-14, 2019, Vancouver, Canada, 12 pages.

Zhang et al., "Why Adam Beats SGD for Attention Models", arXiv:1912.03194v1, Dec. 6, 2019, 20 pages.

Zinkevich et al., "Parallelized Stochastic Gradient Descent", Conference on Neural Information Processing Systems, Dec. 6-11, 2010, Vancouver, Canada, 9 pages.

Reddi et al. "On the Convergency of Adam and Beyond", arXiv 1904v1, Apr. 19, 2019, 23 pages.

Zaheer et al., "Adaptive Methods for Nonconvex Optimization", Conference on Neural Information Processing Systems, 2018, 11 pages.

Brownlee, Gentle Introduction to the Adam Optimization Algorithm for Deep Learning, Jul. 3, 2017.

Kingma et al., "ADAM: A Method for Stochastic Optimization", 2015, 15 pages.

\* cited by examiner

FEDERATED LEARNING WITH ADAPTIVE OPTIMIZATION

RELATED APPLICATIONS

This application is a continuation-in-part of U.S. patent application Ser. No. 17/014,139 filed Sep. 8, 2020, which is a continuation of U.S. patent application Ser. No. 16/657,356, now U.S. Pat. No. 10,769,529, filed Oct. 18, 2019, which claims priority to and the benefit of U.S. Provisional Patent Application No. 62/775,016, filed Dec. 4, 2018. Each of these applications is hereby incorporated by reference in its entirety.

FIELD

The present disclosure relates generally to machine learning. More particularly, the present disclosure relates to federating learning with adaptive optimization.

BACKGROUND

Federated learning (FL) is a machine learning paradigm in which multiple clients (e.g., edge devices, separate organizations, etc.) cooperate to learn a model under the orchestration of a central server. A core tenet of FL is that raw client data is not required to be shared with the server or among distinct clients, which distinguishes FL from traditional distributed optimization and also requires FL to contend with heterogeneous data.

Standard optimization methods, such as mini-batch SGD, are often unsuitable in FL and can incur high communication costs. To this end, many federated optimization methods utilize local client updates in which clients update their models multiple times before communicating to synchronize models. This can greatly reduce the amount of communication required to train a model. One popular such method is FEDAVG (McMahan et al., 2017). In each round of FEDAVG, a small subset of the clients locally perform some number of epochs of SGD. The clients then communicate their model updates to the server, which averages them to compute a new global model.

While FEDAVG has seen remarkable success, recent works have highlighted drawbacks of the method (Karimireddy et al., 2019; Hsu et al., 2019). In particular, two issues that have been identified are: (a) client drift and (b) lack of adaptive learning rates during optimization. Specifically, in heterogeneous settings, multiple local SGD epochs can cause clients to drift away from a globally optimal model. For instance, the extreme case where each client exactly minimizes the loss over its local data using SGD and the server averages the models is equivalent to one-shot averaging, which is known to fail in heterogeneous settings. Moreover, FEDAVG, which is similar in spirit to SGD, may be unsuitable for settings which exhibit heavy-tail stochastic gradient noise distributions during training (Zhang et al., 2019).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform adaptive optimization of a machine-learned model in a federated learning setting. The method includes, at each of a plurality of training iterations: receiving, by a server computing system comprising one or more server computing devices, a plurality of client model updates to the machine-learned model respectively from a plurality of client computing devices, the client model update received from each client computing device generated by performance by the client computing device of a client optimization of a local version of the machine-learned model on one or more training examples stored at the client computing device; determining, by the server computing system, an aggregate client model update from the plurality of client model updates; and performing, by the server computing system, an adaptive server optimization on the aggregate client model update to generate an updated global version of the machine-learned model. Performing, by the server computing system, the adaptive server optimization includes adaptively determining, by the server computing system, a current effective learning rate applied at the current training iteration based at least in part on one or more past aggregate client model updates determined in one or more past training iterations.

Another example aspect of the present disclosure is directed to a computing system that includes one or more processors and one or more non-transitory computer-readable media that store: a machine-learned model that has been trained through performance of adaptive optimization in a federated learning setting, wherein the adaptive optimization comprises an adaptive server optimization performed by a server computing system on an aggregate client model update to generate an updated global version of the machine-learned model, wherein, at each of a plurality of training iterations, the adaptive server optimization comprises adaptive determination of a current effective learning rate applied at the training iteration based at least in part on one or more past aggregate client model updates determined in one or more past training iterations; and instructions that, when executed by the one or more processors, cause the computing system to employ the machine-learned model to generate predictions based on input data.

Another example aspect of the present disclosure is directed to client computing device configured to perform adaptive optimization of a machine-learned model in a federated learning setting. The client device includes one or more processors and one or more non-transitory computer-readable media that store instructions that, when executed by the one or more processors, cause the client computing device to perform operations. The operations include, for each of a plurality of training operations: performing a client optimization of a local version of a machine-learned model on one or more training examples stored at the client computing device to generate a client model update; transmitting the client model update to a server computing system that performs an adaptive server optimization on an aggregate client model update derived from the client model update to generate an updated global version of the machine-learned model, wherein, at training iteration, the adaptive server optimization comprises adaptive determination of a current effective learning rate applied at the training iteration based at least in part on one or more past aggregate client model updates determined in one or more past training iterations; and receiving the updated global version of the machine-learned model from the server computing system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
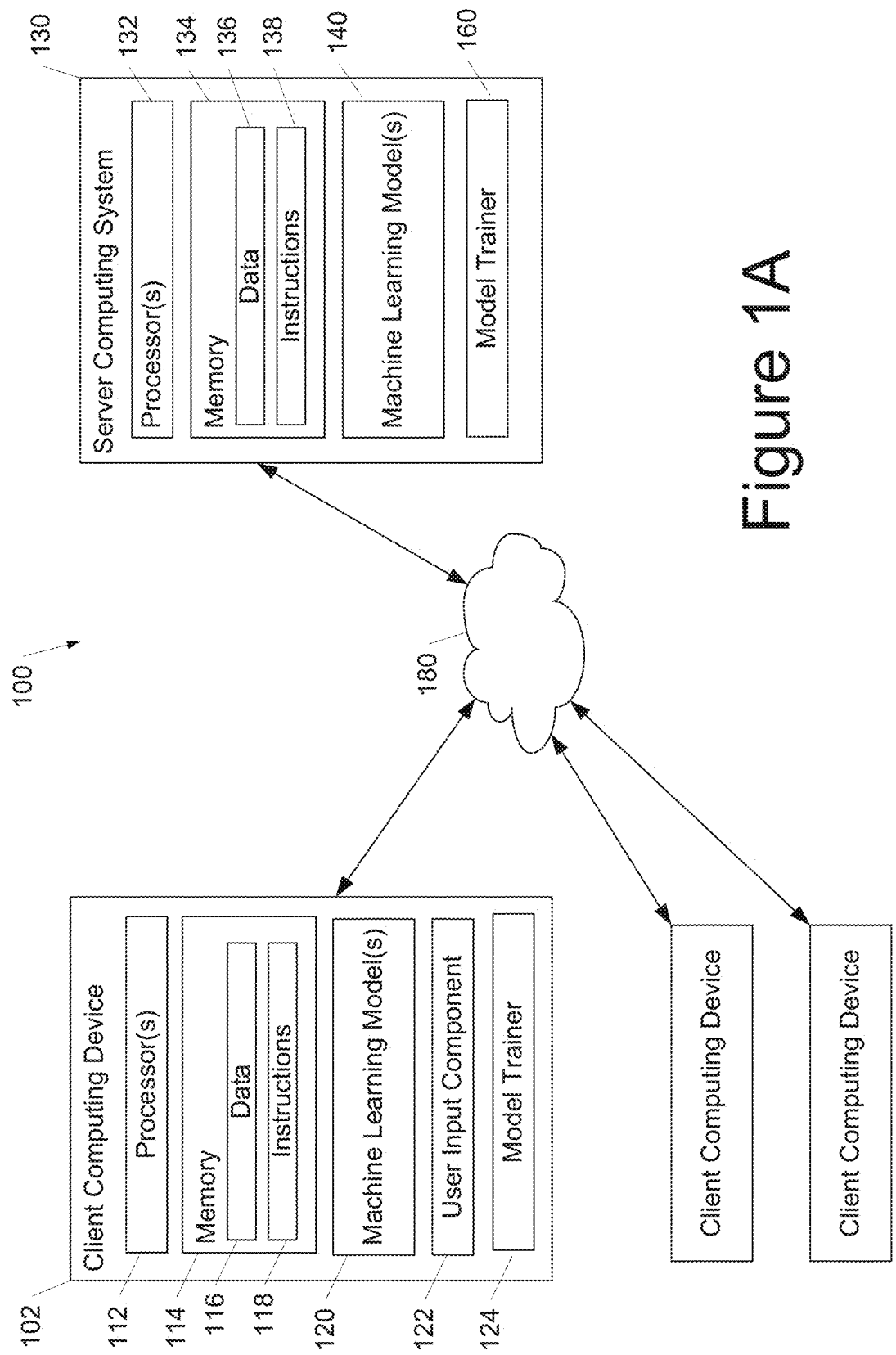
FIG. 1A depicts a block diagram of an example computing system that performs federated learning with adaptive optimization according to example embodiments of the present disclosure.

Reference numerals that are repeated across plural figures are intended to identify the same features in various implementations.

DETAILED DESCRIPTION

Overview

Generally, the present disclosure is directed to a computing system and method that can be used to implement a version of federated learning (FL) that incorporates adaptivity (e.g., leverages an adaptive learning rate). In particular, the present disclosure provides a general optimization framework in which (1) clients perform multiple epochs of training using a client optimizer to minimize loss on their local data and (2) a server system updates its global model by applying a gradient-based server optimizer to the average of the clients' model updates. This framework can seamlessly incorporate adaptivity by using adaptive optimizers as client and/or server optimizers. Building upon this general framework, the present disclosure also provides example specific adaptive optimization techniques for FL which use per-coordinate methods as server optimizers. By focusing on adaptive server optimization, the use of adaptive learning rates is enabled without increase in client storage or communication costs and compatibility with cross-device FL can be ensured.

More particularly, FL is a distributed machine learning paradigm in which multiple clients (e.g., edge devices, separate organizations, etc.) can cooperate to learn a model under an orchestration of a central server. In particular, raw client data can be protected, i.e., not shared, with the server or among distinct clients. The present disclosure provides techniques which enable FL techniques to include or leverage adaptivity such as adaptive learning rates.

Example adaptive federated learning techniques can comprise training or learning a model iteratively in a federated fashion with adaptivity used at the client and/or server. In particular, at each of a plurality of training iterations, a server computing system can receive a plurality of client model updates to a machine-learned model from a plurality of clients. Specifically, a respective client model update can be received from each client computing device that is used during that iteration (e.g., in some cases only a subset of clients are used at each iteration).

Thus, at each training iteration, each participating client can perform a client optimization of a respective local version of the machine-learned model on one or more training examples. The one or more training examples can be stored at the client computing device. The client optimization may or may not be adaptive (e.g., leverage an adaptive learning rate) over multiple local training iterations.

In some implementations, each client model update can include a set of model difference values describing differences in model parameter values of parameters of the local version of the machine-learned model resulting from performance by the client computing device of the client optimization.

At each training iteration, the server computing system can determine an aggregate client model update from the plurality of client model updates. The server computing can perform adaptive server optimization using the aggregate client model update. Adaptive server optimization can include adaptively determining a current effective learning rate applied at the current training iteration. Specifically, in some implementations, the current effective learning rate can be based at least in part on one or more past aggregate client model updates determined in one or more past training iterations.

As one example, determining the current effective learning rate can include determining a current learning rate control value based on the aggregate client model update and then determining the current effective learning rate based at least in part on the current learning rate control value.

As one example, the current learning rate control value can equal a most recent learning rate control value plus a square of the aggregate client model update. As another example, the current learning rate control value can equal a most recent learning rate control value minus an update value, where the update value is equal to a square of the aggregate client model update multiplied by a sign function applied to the most recent learning rate control value minus the square of the aggregate client model update and multiplied by a scaling coefficient that is equal to one minus an update scaling parameter. As yet another example, the current learning rate control value can equal a most recent learning rate control value times an update scaling parameter minus a square of the aggregate client model update times one minus the update scaling parameter.

In some implementations, determining the current effective learning rate applied at the current training iteration can include dividing a current learning rate by a square root of the current learning rate control value. Alternatively, determining the current effective learning rate applied at the current training iteration can include dividing the current learning rate by the square root of the current learning rate control value plus an adaptivity control value.

The server computing system can use the aggregate client model update and the current effective learning rate to generate an updated global version of the machine-learned model. As one example, to generate the updated global version of the machine-learned model, the server computing system can set the updated global version of the machine-learned model equal to a current global version of the machine-learned model plus a global update, where the global update equals a current effective learning rate times the aggregate client model update, and optionally further times a current momentum value.

The server computing system can then transmit the updated global version of the machine-learned model to one or more of the plurality of client computing devices. Additional training iterations can continue in this way.

The systems and methods of the present disclosure provide a number of technical effects and benefits. As one example, by enabling the use of adaptive optimizers (e.g., ADAGRAD, ADAM, YOGI, etc.) within a general federated learning framework, the present disclosure resolves challenges associated with existing federated learning techniques. More particularly, example aspects of the present disclosure can be viewed as a framework in which clients perform multiple epochs of model updates using some client optimizer to minimize the loss on their local data while the server updates a global model by applying a gradient-based server optimizer to the average of the clients' model updates in order to minimize the loss across clients. Adaptive learning rates can be used at both client and/or server stages to control client drift. Controlling client drift can assist in reducing instances in which a model fails to converge, thereby avoiding wasting computing resources. In addition, some example implementations use per-coordinate adaptive methods as server optimizers. This can enable the improved application of federated learning techniques to settings which exhibit heavy-tail stochastic gradient noise distributions.

As another example technical effect, the number of communication rounds required to reach a desired performance level can be reduced. This can conserve computing resources such as processor usage, memory usage, and/or network bandwidth. Thus, example techniques are provided which enable a computer-implemented method that can be used to implement federated learning using adaptive optimizers to better deal with heterogeneous data.

With reference now to the Figures, example embodiments of the present disclosure will be discussed in further detail.

Example Federated Learning and FEDAVG

Federated learning can be used to solve certain optimization problems. In particular, optimization problems such as $$\min_{x \in R^d} f(x) = \frac{1}{m}\sum_{i=1}^{m} F_i(x),$$

where $F_i(x) = \mathbb{E}_{z \sim \mathcal{D}_i}[f_i(x,z)]$, may be the loss function of the $i^{th}$ client, $z \in \mathcal{Z}$, and $\mathcal{D}_i$ may be the data distribution for the $i^{th}$ client. For $i \neq j$, $\mathcal{D}_i$ and $\mathcal{D}_j$ may be very different. The functions $F_i$ (and therefore $f$) may be nonconvex. For each $i$ and $x$, access can be assumed to an unbiased stochastic gradient $g_i(x)$ of the client's true gradient $\nabla F_i(x)$.

Furthermore, one or more additional assumptions may be made. For example, an assumption known as the Lipschitz Gradient assumption may be made (referred to as Assumption 1 from here on). Assumption 1 refers to the assumption that the function $F_i$ is L-smooth for all $i \in [m]$ i.e., $\|\nabla F_i(x) - \nabla F_i(y)\| \leq L\|x-y\|$, for all $x, y \in \mathbb{R}^d$. As another example, an assumption known as the Bounded Variance assumption may be made (referred to as Assumption 2 from here on). Assumption 2 refers to the assumption that the function $F_i$ have $\sigma_l$-bounded (local) variance i.e., $\mathbb{E}[\|\nabla[f_i(x,z)]_j - [\nabla F_i(x)]_j\|^2] = \sigma_{l,j}^2$ for all $x \in \mathbb{R}^d$, $j \in [d]$ and $i \in [m]$. Furthermore, we assume the (global) variance is bounded, (1m) $\Sigma_{i=1}^{m}\|\nabla[F_i(x)]_j - [\nabla f(x)]_j\|^2 \leq \sigma_{g,j}^2$ for all $x \in \mathbb{R}^d$ and $j \in [d]$. As yet another example, an assumption known as the Bounded Gradients assumption may be made (referred to as Assumption 3 from here on). Assumption 3 refers to the assumption that The function $f_i(x, z)$ have G-bounded gradients i.e., for any $i \in [m]$, $x \in \mathbb{R}^d$ and $z \in \mathcal{Z}$ we have $|[\nabla f_i(x, z)]_j| \leq G$ for all $j \in [d]$.

In some implementations, $\sigma_l^2$ and $\sigma_g^2$ may be used to denote $\Sigma_{j=1}^{d}\sigma_{l,j}^2$ and $\Sigma_{j=2}^{d}\sigma_{g,j}^2$. Furthermore, with regards to Assumption 2, the bounded variance may be between the client objective functions and the overall objective function. In particular, the parameter $\sigma_g$ can quantify similarity of client objective functions. Specifically, the case of $\sigma_g=0$ may correspond to the i.i.d. setting.

In some implementations, FEDAVG may be used to perform optimization in federated settings. At each round of FEDAVG, a subset of client(s) can be selected. In particular, the subset of client(s) can be selected randomly. The server can broadcast its global model to each client. In parallel, the client(s) can run SGD on their own loss function. The client(s) may send the resulting model to the server. The server may then update its global model as the average of the local models.

As an example, at round t, the server can have model $x_t$. Furthermore, the server can sample a set $\mathcal{S}$ of clients. Additionally, $x_i^t$ may denote the model of each client $i \in \mathcal{S}$ after local training. FEDAVG's update could be rewritten as $$x_{t+1} = \frac{1}{|S|}\sum_{i \in S} x_i^t = x_t - \frac{1}{|S|}\sum_{i \in S} (x_t - x_i^t).$$

Let $\Delta_i^t := x_i^t - x_t$ and $\Delta_t := (1/|S|)\Sigma_{i \in S}\Delta_i^t$. Then the server update in FEDAVG may be comparable to applying SGD to the "pseudo-gradient" $-\Delta_t$ with learning rate $\eta=1$. Under this formulation other choices of $\eta$ may be possible. The clients may use optimizers other than SGD, or may use an alternative update rule on the server to apply the "pseudo-gradient". An exemplary embodiment of this family of algorithms, collectively referred to as FEDOPT, can be seen below as Algorithm 1.

| Algorithm 1 FEDOPT. |
| --- |
| Input: $x_0$, CLIENTOPT, SERVEROPT |
| 1:  for t = 0, . . . , T − 1 do |
| 2:     Sample a subset $\mathcal{S}$ of clients |
| 3:     $x_{i,0}^t = x_t$ |
| 4:     for each client $i \in \mathcal{S}$ in parallel do |
| 5:       for k = 0, . . . , K − 1 do |
| 6:         Compute an unbiased estimate $g_{i,k}^t$ of $\nabla F_i(x_{i,k}^t)$ |
| 7:         $x_{i,k+1}^t$ = CLIENTOPT $(x_{i,k}^t, g_{i,k}^t, \eta_l, t)$ |
| 8:     $\Delta_i^t = x_{i,K}^t - x_t$ |

| Algorithm 1 FEDOPT. |
| --- |
| 9: $\quad \Delta_t = \frac{1}{|S|}\sum_{i \in S} \Delta_i^t$ |
| 10: $\quad x_{t+1} = \text{SERVEROPT}(x_t, -\Delta_t, \eta, t)$ |

In some implementations, CLIENTOPT and SERVEROPT can be classified as gradient-based optimizers. CLIENTOPT and SERVEROPT may have learning rates $\eta_l$ and $\eta$ respectively. CLIENTOPT may optimize the objective based on their local data. On the other hand, SERVEROPT may optimize the objective from a global perspective. FEDOPT can allow the use of adaptive optimizers (e.g., ADAM, YOGI, etc.). FEDOPT may further allow techniques such as server-side momentum such as FEDAVGM. Generally, FEDOPT may use a CLIENTOPT whose updates can depend on globally aggregated statistics (e.g., server updates in the previous iterations). $\eta$ and $\eta_l$ may be allowed to depend on the round t in order to encompass learning rate schedules. Theoretical and empirical analysis may suggest that a user may decay the client learning rate.

Example Federated Optimization

Some example implementations of the present disclosure leverage specializing FEDOPT to settings where SERVEROPT can be an adaptive optimization method (e.g., ADAGRAD, YOGI, ADAM, etc.) and, as one example, CLIENTOPT can be SGD. Algorithm 2, as seen below, can provide pseudo-code for these example adaptive federated optimizers.

In some implementations, the parameter $\tau$ in all the algorithms can control their degree of adaptivity, wherein smaller values of $\tau$ can represent higher degrees of adaptivity. Updates of these methods may be invariant to fixed multiplicative changes to the client learning rate $\eta_l$ for appropriately chosen $\tau$; although $\eta_l$ may still have size constraints.

Convergence can be achieved in the case of full participation (e.g., $S = [m]$) and in cases with limited participation. Furthermore, non-uniform weighted averaging typically used in FEDAVG can also optionally be incorporated.

Theorem 1 Let Assumptions 1, 2, and 3 hold, and let L, G, $\sigma_l$, $\sigma_g$ be as defined therein. Let $\sigma^2 = \sigma_l^2 + 6K\sigma_g^2$. Consider the following conditions for $\eta_l$. ((Condition I):

$$\eta_l \leq \frac{1}{8LK}$$

and (Condition II):

$$\eta_l \leq \frac{1}{3K}\min\left\{\frac{1}{T^{1/10}}\left[\frac{\tau^3}{L^2G^3}\right]^{1/5}, \frac{1}{T^{1/8}}\left[\frac{\tau^2}{L^3Gq}\right]^{1/4}\right\}.$$

Under Condition I only, the iterates of Algorithm 2 for FEDADAGRAD satisfy $$\min_{0 \leq t \leq T-1} \|\nabla f(x_t)\|^2 \leq O\left(\left[\frac{G}{\sqrt{T}} + \frac{\tau}{\eta_l KT}\right](\Psi + \Psi_{var})\right).$$

When both Condition I & II and satisfied, $$\min_{0 \leq t \leq T-1} \|\nabla f(x_t)\|^2 \leq O\left(\left[\frac{G}{\sqrt{T}} + \frac{\tau}{\eta_l KT}\right](\Psi + \tilde{\Psi}_{var})\right).$$

Here, $\Psi$, $\Psi_{var}$ and $\tilde{\Psi}_{var}$ are defined as:

$$\Psi = \frac{f(x_0) - f(x^*)}{\eta} + \frac{5\eta_l^3 K^2 L^2 T}{2\tau}\sigma^2,$$

$$\Psi_{var} = \frac{d(\eta_l KG^2 + \tau\eta L)}{\tau}\left[1 + \log\left(1 + \frac{\eta_l^2 K^2 G^2 T}{\tau^2}\right)\right],$$

$$\tilde{\Psi}_{var} = \frac{2\eta_l KG^2 + \tau\eta L}{\tau^2}\left[\frac{2\eta_l^2 KT}{m}\sigma_l^2 + 10\eta_l^4 K^3 L^2 T\sigma^2\right].$$

In some implementations, when $\eta_l$ satisfies the condition in the second part of the above result, a convergence rate depending on $\{\Psi_{var}, \tilde{\Psi}_{var}\}$ may be obtained. In order to obtain an explicit dependence on T and K, the above result can be simplified for a specific choice of $\eta$, $\eta_l$ and $\tau$.

| Algorithm 2 FEDADAGRAD, FEDYOGI, and FEDADAM |
| --- |
| Initialization: $x_0$, $v_{-1} \geq \tau^2$, optional decay $\beta_1, \beta_2 \in [0,1)$ for FEDYOGI and FEDADAM |
| 1: $\quad$ for t = 0, . . . , T − 1 do |
| 2: $\quad\quad$ Sample a subset $S$ of clients |
| 3: $\quad\quad$ $x_{i,0}^t = x_t$ |
| 4: $\quad\quad$ for each client $i \in S$ in parallel do |
| 5: $\quad\quad\quad$ for k = 0, . . . , K − 1 do |
| 6: $\quad\quad\quad\quad$ Compute an unbiased estimate $g_{i,k}^t$ of $\nabla F_i(x_{i,k}^t)$ |
| 7: $\quad\quad\quad\quad$ $x_{i,k+1}^t = x_{i,k}^t - \eta_l g_{i,k}^t$ |
| 8: $\quad\quad\quad$ $\Delta_i^t = x_{i,K}^t - x_t$ |
| 9: $\quad\quad$ $\Delta_t = \frac{1}{|S|}\sum_{i \in S}\Delta_i^t$ |
| 10: $\quad\quad$ $\Delta_t = \beta_1\Delta_{t-1} + (1 - \beta_1)\Delta_t$ |
| 11: $\quad\quad$ $v_t = v_{t-1} + \Delta_t^2$ (FEDADAGRAD) |
| 12: $\quad\quad$ $v_t = v_{t-1} - (1 - \beta_2)\Delta_t^2(v_{t-1} - \Delta_t^2)$ (FEDYOGI) |
| 13: $\quad\quad$ $v_t = \beta_2 v_{t-1} + (1 - \beta_2)\Delta_t^2$ (FEDADM) |
| 14: $\quad\quad$ $x_{t+1} = x_t + \eta\frac{\Delta_t}{\sqrt{v_t} + \tau}$ |

Corollary 1 Suppose $\eta_l$ is such that the conditions in Theorem 1 are satisfied and $\eta_l = \Theta(1/(KL\sqrt{T}))$. Also suppose $\eta = \Theta(\sqrt{Kn})$ and $\tau = G/L$. Then, for sufficiently large T, the iterates of Algorithm 2 for FEDADAGRAD satisfy:

$$\min_{0 \leq t \leq T-1} \|\nabla f(x_t)\|^2 = O\left(\frac{f(x_0) - f(x^*)}{\sqrt{mKT}} + \frac{2\sigma_l^2 L}{G^2\sqrt{mKT}} + \frac{\sigma^2}{GKT} + \frac{\sigma^2 L\sqrt{m}}{G^2\sqrt{K}T^{3/2}}\right).$$

The convergence analysis of FEDADAM is provided below, and the proof of FEDYOGI is very similar.

Theorem 2 Let Assumptions 1, 2, and 3 hold, and let L, G, $\sigma_l$, $\sigma_g$ be as defined therein. Let $\sigma^2 = \sigma_l^2 + 6K\sigma_g^2$. Suppose the client learning rate satisfies $\eta_l \leq 1/8LK$ and $$\eta_l \leq \frac{1}{6K}\min\left\{\left[\frac{\tau}{GL}\right]^{1/2}, \left[\frac{\tau^2}{GL^3\eta}\right]^{1/4}\right\}.$$

The iterates of Algorithm 2 for FEDADAM satisfy $$\min_{0 \le t \le T-1} \|\nabla f(x_t)\|^2 \le O\left(\frac{\sqrt{\beta_2}\,\eta_l KG + \tau}{\eta_l KT}(\Psi + \Psi_{var})\right),$$

where $$\Psi = \frac{f(x_0) - f(x^*)}{\eta} + \frac{5\eta_l^2 K^2 L^2 T}{2\tau}\sigma^2,$$

$$\Psi_{var} = \left(G + \frac{\eta L}{2}\right)\left[\frac{4\eta_l^2 KT}{m\tau^2}\sigma_l^2 + \frac{20\eta_l^4 K^3 L^2 T}{\tau^2}\sigma^2\right].$$

Similar to the FEDADAGRAD case, the above result for a specific choice of $\eta_l$, $\eta$ and $\tau$ can be restated in order to highlight the dependence of K and T.

Corollary 2 Suppose $\eta_l$ is chosen such that the conditions in Theorem 2 are satisfied and that $\eta_l = \theta(1/(KL\sqrt{T}))$. Also suppose $\eta = \theta(\sqrt{Km})$ and $\tau = G/L$. Then, for sufficiently large T, the iterates of Algorithm 2 for FEDADAM satisfy:

$$\min_{0 \le t \le T-1} \|\nabla f(x_t)\|^2 = O\left(\frac{f(x_0) - f(x^*)}{\sqrt{mKT}} + \frac{2\sigma_l^2 L}{G^2\sqrt{mKT}} + \frac{\sigma^2}{GKT} + \frac{\sigma^2 L\sqrt{m}}{G^2\sqrt{K}\,T^{3/2}}\right).$$

In some implementations, when T is sufficiently large compared to K, $O:(1/\sqrt{mKT}$ is the dominant term in Corollary 1 & 2. Thus, a convergence rate of $O:(1/\sqrt{mKT})$ can be obtained. More specifically, a convergence rate which matches the best known rate for the general non-convex setting of interest can be obtained. It is also noted that in the i.i.d setting which corresponds to $\sigma_g = 0$, convergence rates may be matched. Similar to the centralized setting, it is possible to obtain convergence rates with better dependence on constants for federated adaptive methods, compared to FEDAVG, by incorporating non-uniform bounds on gradients across coordinates.

In some implementations, the client learning rate of $1/\sqrt{T}$ in may require knowledge of the number of rounds T beforehand; however, it is possible to generalize to the case where $\eta_l$ is decayed at a rate of $1/\sqrt{T}$. More particularly, $\eta_l$ preferably decays, rather than the server learning rate $\eta$, to obtain convergence. This is because the client drift introduced by the local updates does not vanish as $T \to \infty$ when $\eta_l$ is constant. In particular, learning rate decay can improve empirical performance. Additionally, there may be an inverse relationship between $\eta_l$ and $\eta$ in Corollary 1 & 2.

In some implementations, the total communication cost of the algorithms can depend on the number of communication rounds T. From Corollary 1 & 2, it can be seen that a larger K may lead to fewer rounds of communication as long as $K = O(T\sigma_l^2/\sigma_g^2)$. Thus, the number of local iterations can be large when either the ratio $\sigma_l^2/\sigma_g^2$ or T is large. In the i.i.d setting Where $\sigma_g = 0$, K can be very large.

As mentioned earlier, for the sake of simplicity, the analysis assumes full-participation ($S = [m]$). However, the analysis can be directly generalized to limited participation at the cost of an additional variance term in the rates that depends on the cardinality of the subset $S$.

Additional Example Algorithms

While Algorithms 1 and 2 are useful for understanding relations between federated optimization methods, the present disclosure also provides practical versions of these algorithms. In particular, Algorithms 1 and 2 are stated in terms of a kind of 'gradient oracle', where unbiased estimates of the client's gradient are computed. In practical scenarios, there may only be access to finite data samples, the number of which may vary between clients.

As such, $\mathcal{D}_i$ can be assumed to be the uniform distribution over some finite set $D_i$ of size $n_i$. The $n_i$ may vary significantly between clients, requiring extra care when implementing federated optimization methods. It can be assumed that the set $D_i$ is partitioned into a collection of batches $\mathcal{B}_i$, each of size B. For $b \in \mathcal{B}_i$, let $f_i(x:b)$ denote the average loss on this batch at x with corresponding gradient $\nabla f_i(x:b)$. Thus, if b is sampled uniformly at random from $\mathcal{B}_i$, $\nabla f_i(x:b)$ is an unbiased estimate of $\nabla F_i(x)$.

When training, instead of uniformly using K gradient steps, as in Algorithm 1, alternative implementations will instead perform E epochs of training over each client's dataset. Additionally, a weighted average can be taken of the client updates, where weighting is performed according to the number of examples $n_i$ in each client's dataset. This leads to a batched data version of FEDOPT in Algorithm 3, below, and a batched data version of FEDADAGRAD, FEDADAM, and FEDYOGI, given in Algorithm 4, below.

---

Algorithm 3 FEDOPT - Batched Data

---

Input: $x_0$, CLIENTOPT, SERVEROPT,
1:    for t = 0, . . . , T − 1 do
2:        Sample a subset $S$ of clients
3:        $x_i^t = x_t$
4:        for each client $i \in S$ in parallel do
5:            for e = 1, . . . , E do
6:                for $b \in \mathcal{B}_i$ do
7:                    $g_i^t = \nabla f_i(x_i^t; b)$
8:                    $x_i^t$ = CLIENTOPT $(x_i^t, g_i^t, \eta_l, t)$
9:        $\Delta_i^t = x_i^t - x_t$
10:

$$n = \sum_{i \in S} n_i, \quad \Delta_t = \sum_{i \in S} \frac{n_i}{n} \Delta_i^t$$

11:        $x_{t+1}$ = SERVEROPT $(x_t, -\Delta_t, \eta, t)$

---

In the example experimental results contained herein, Algorithm 3 was used when implementing FEDAVG and FEDAVGM. In particular, FEDAVG and FEDAVGM correspond to Algorithm 3 where CLIENTOPT and SERVEROPT are SGD. FEDAVG uses vanilla SGD on the server, while FEDAVGM uses SGD with a momentum parameter of 0.9. In both methods, client learning rate $\eta_l$ and server learning rate $\eta$ are tuned. This means that the version of FEDAVG used in all experiments is strictly more general than that in (McMahan et al., 2017), which corresponds to FEDAVG where CLENTOPT and SERVEROPT are SGD, and SERVEROPT has a learning rate of 1.

---

Algorithm 4 FEDADAGRAD, FEDYOGI, and FEDADAM - Batched Data

---

Input: $x_0$, $v_{-1} \ge \tau^2$, optional $\beta_1$, $\beta_2 \in [0,1)$ for FEDYOGI and FEDADAM
1:    for t = 0, . . . , T − 1 do
2:        Sample a subset $S$ of clients
3:        $x_i^t = x_t$
4:        for each client $i \in S$ in parallel do
5:            for e = 1, . . . , E do
6:                for $b \in \mathcal{B}_i$ do
7:                    $x_i^t = x_i^t - \eta_l \nabla f_i(x_i^t; b)$
8:        $\Delta_i^t = x_i^t - x_t$
9:

$$n = \sum_{i \in S} n_i, \quad \Delta_t = \sum_{i \in S} \frac{n_i}{n} \Delta_i^t$$

Algorithm 4 FEDADAGRAD, FEDYOGI, and FEDADAM - Batched Data

10 :   $\Delta_t = \beta_1 \Delta_{t-1} + (1 - \beta_1)\Delta_t$
11:   $v_t = v_{t-1} + \Delta_t^2$ (FEDADAGRAD)
12:   $v_t = v_{t-1} - (1 - \beta_2)\Delta_t^2(v_{t-1} - \Delta_t^2)$ (FEDYOGI)
13:   $v_t = \beta_2 v_{t-1} + (1 - \beta_2)\Delta_t^2$ (FEDADM)

14:   $x_{t+1} = x_t + \eta \dfrac{\Delta_t}{\sqrt{v_t} + \tau}$

Algorithm 4 was used for all implementations of FEDADAGRAD, FEDADAM, and FEDYOGI in the example experimental results. For FEDADAGRAD, the following settings were used: $\beta_1 = \beta_2 = 0$ (as typical versions of ADAGRAD do not use momentum). For FEDADAM and FEDYOGI, the following settings were used: $\beta_1 = 0.9$, $\beta_2 = 0.99$. While these parameters are generally good choices, better results may be obtainable by tuning these parameters.

Example Devices and Systems

FIG. 1A depicts a block diagram of an example computing system 100 that performs federated learning with adaptive optimization according to example embodiments of the present disclosure. The system 100 includes a number of client computing devices (e.g., client computing device 102) and a server computing system 130 that are communicatively coupled over a network 180.

The client computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the client computing device 102 to perform operations.

In some implementations, the client computing device 102 can store or include one or more machine learning models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks.

In some implementations, the one or more machine-learned models 120 can (e.g., iteratively) be received from the server computing system 130 over network 180, stored in the client computing device memory 114, and then used or otherwise implemented by the one or more processors 112. For example, local versions of the models 120 can be stored, employed for inference, and/or trained at the device 102. For example, the local model 120 can be re-trained by a model trainer 124 based on the locally stored data 116. Further, data pertaining to any local updates to the model 120 can be transmitted back to the server computing system 130. In some implementations, the client computing device 102 can implement multiple parallel instances of a single machine-learned model 120.

Model trainer 124 can train the machine-learned model 120 stored at the client computing device 102 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. In some implementations, performing backwards propagation of errors can include performing truncated backpropagation through time. The model trainer 124 can perform a number of generalization techniques (e.g., weight decays, dropouts, etc.) to improve the generalization capability of the models being trained. Model trainer 124 can perform adaptive or non-adaptive optimization techniques.

The model trainer 124 includes computer logic utilized to provide desired functionality. The model trainer 124 can be implemented in hardware, firmware, and/or software controlling a general purpose processor. For example, in some implementations, the model trainer 124 includes program files stored on a storage device, loaded into a memory and executed by one or more processors. In other implementations, the model trainer 124 includes one or more sets of computer-executable instructions that are stored in a tangible computer-readable storage medium such as RAM, hard disk, or optical or magnetic media.

Additionally, one or more machine-learned models 140 can be included in or otherwise stored and implemented by the server computing system 130 that communicates with the client computing device 102 according to a client-server relationship. For example, the machine-learned models 140 can be global versions of the models 120 which are aggregately learned across all client computing devices. Thus, one or more local models 120 can be stored and implemented at the client computing device 102 and one or more global models 140 can be stored and implemented at the server computing system 130.

The client computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The client computing device 102 and/or the server computing system 130 can train the models 120 and/or 140 via interaction with a model trainer 160 that trains the machine-learned models 120 and/or 140 stored at the server computing system 130 using various training or learning techniques. In one example, the model trainer 160 can receive local model updates from a number of the client computing devices and can determine an update to the global model 140 based on the local model updates. For example, an adaptive optimization technique can be used to determine a global model update based on the local model updates received from the client computing devices.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well.

Figure 1B:
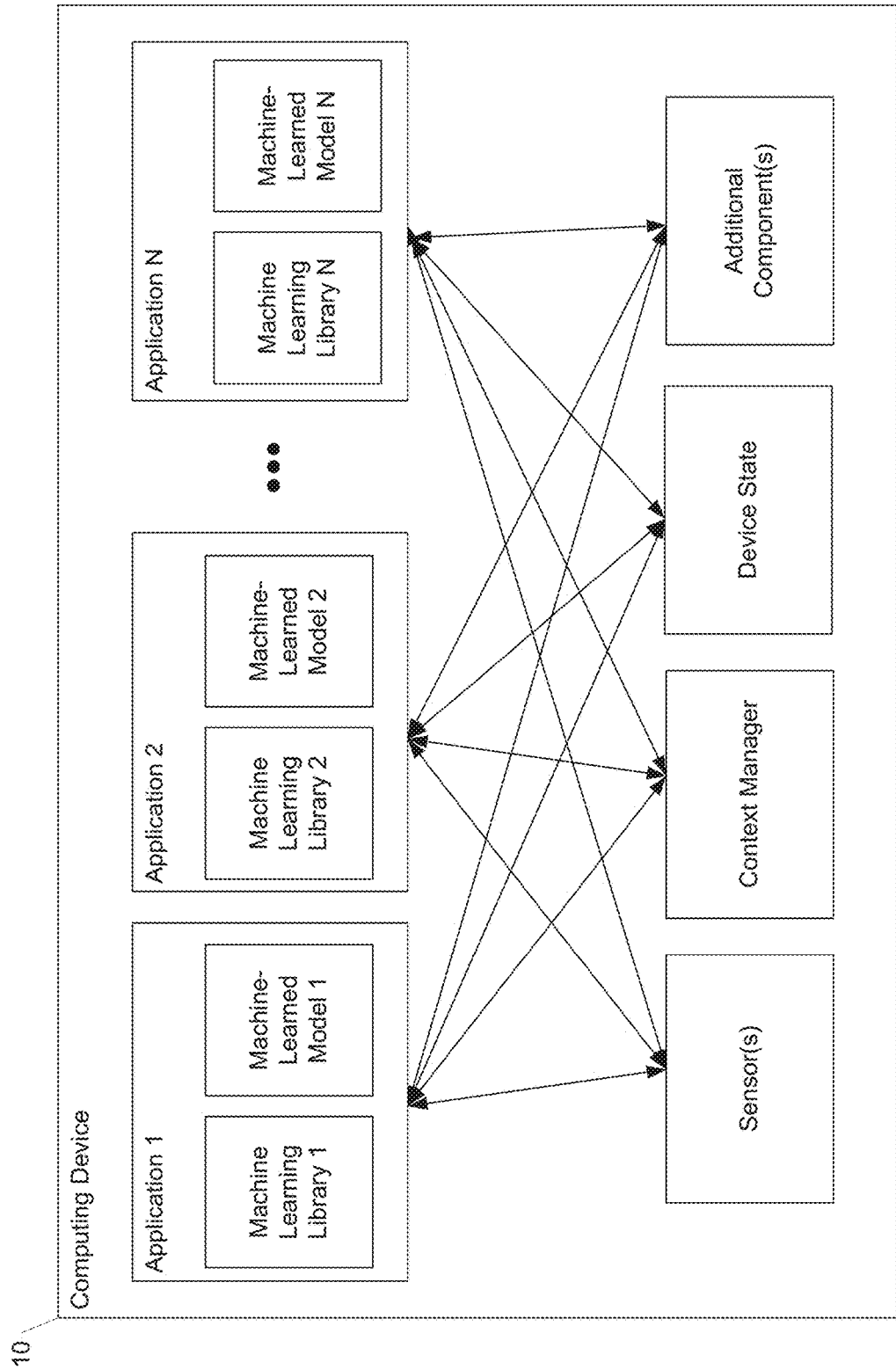
FIG. 1B depicts a block diagram of an example computing device according to example embodiments of the present disclosure.

FIG. 1B depicts a block diagram of an example computing device 10 according to example embodiments of the present disclosure. The computing device 10 can be a client computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
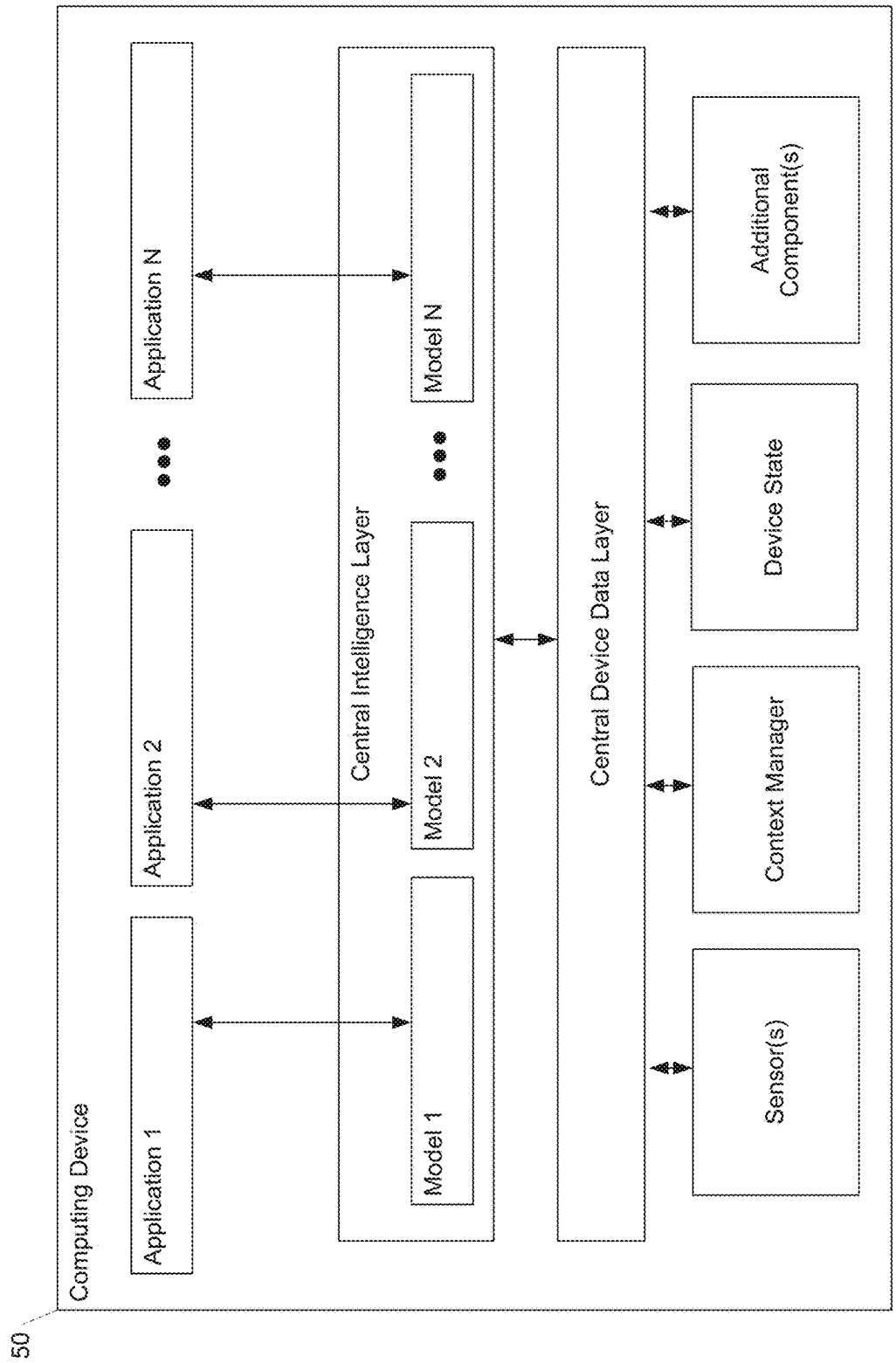
FIG. 1C depicts a block diagram of an example computing device according to example embodiments of the present disclosure.

FIG. 1C depicts a block diagram of an example computing device 50 according to example embodiments of the present disclosure. The computing device 50 can be a client computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2:
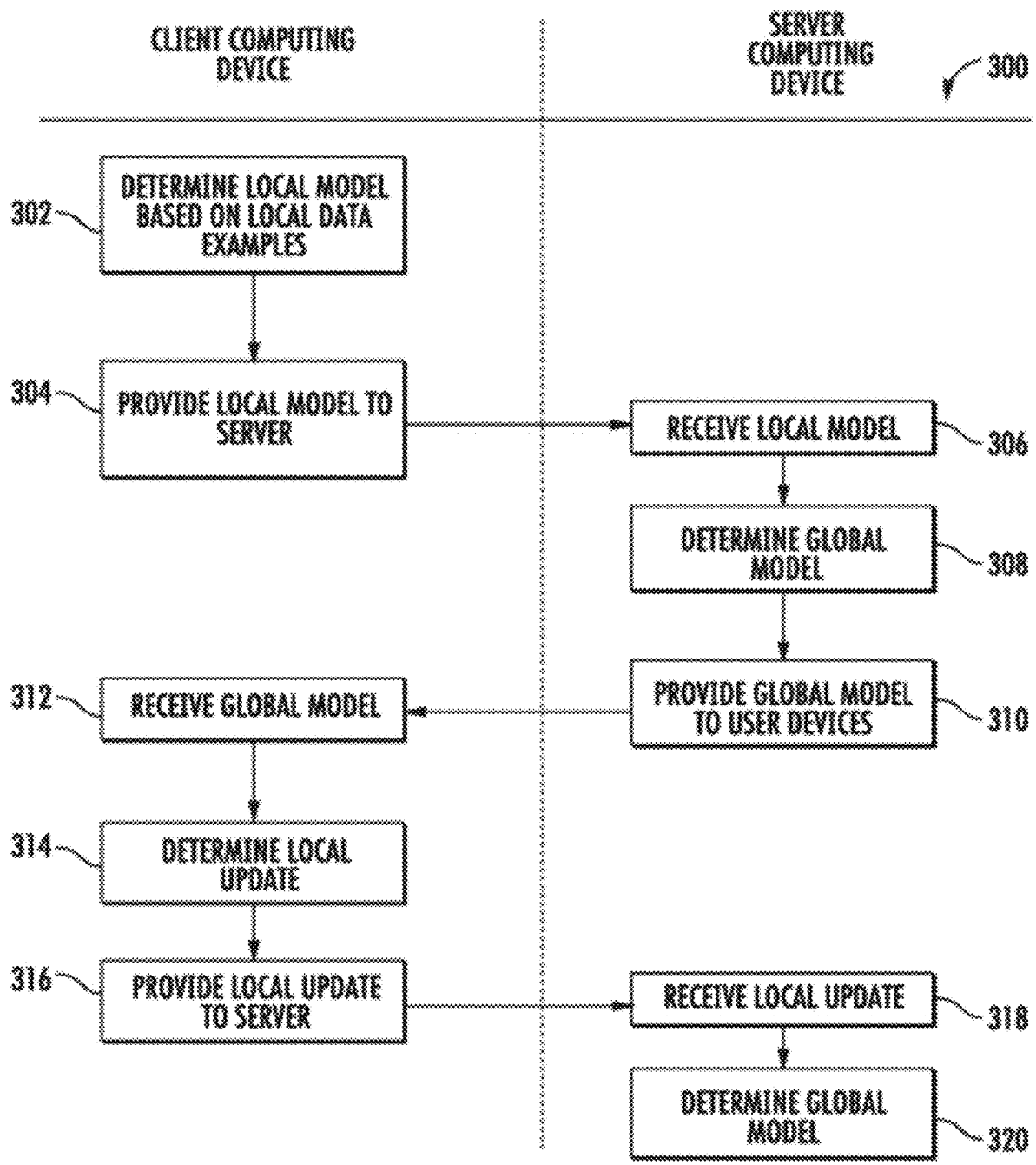
FIG. 2 depicts a flow chart diagram of an example method to perform adaptive federated optimization according to example embodiments of the present disclosure.

FIG. 2 depicts a flow diagram of an example method (300) of determining a global model according to example embodiments of the present disclosure. Method (300) can be implemented by one or more computing devices, such as the computing system shown in FIG. 1A. In addition, FIG. 2 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include determining, by a client device, a local model based on one or more local data examples. In particular, the local model can be determined for a loss function using the one or more data examples. The data examples may be generated, for instance, through interaction of a user with the client device. In some implementations, the model may have been pre-trained prior to local training at (302). In some implementations, the local model update can be determined by performing adaptive or non-adaptive optimization.

At (304), method (300) can include providing, by the client device, the local model update to a server, and at (306), method (300) can include receiving, by the server, the local model update. In some implementations, the local model or local update can be encoded or compressed prior to sending the local model or update to the server. In some implementations, the local model update can describe a respective change to each parameter of the model that resulted from the training at (302).

At (308), method (300) can include determining, by the server, a global model based at least in part on the received local model update. For instance, the global model can be determined based at least in part on a plurality of local model updates provided by a plurality of client devices, each having a plurality of unevenly distributed data examples. In particular, the data examples may be distributed among the client devices such that no client device includes a representative sample of the overall distribution of data. In addition, the number of client devices may exceed the number of data examples on any one client device.

In some implementations, as part of the aggregation process, the server can decode each received local model or local update. In some implementations, the server can perform an adaptive optimization or adaptive update process at 308 (e.g., as described in Algorithm 2).

At (310), method (300) can include providing the global model to each client device, and at (312), method (300) can include receiving the global model.

At (314), method (300) can include determining, by the client device, a local update. In a particular implementation, the local update can be determined by retraining or otherwise updating the global model based on the locally stored training data.

In some implementations, the local update can be determined based at least in part using one or more stochastic updates or iterations. For instance, the client device may randomly sample a partition of data examples stored on the client device to determine the local update. In particular, the local update may be determined using stochastic model descent techniques to determine a direction in which to adjust one or more parameters of the loss function.

In some implementations, a step size associated with the local update determination can be determined based at least in part on a number of data examples stored on the client device. In further implementations, the stochastic model can be scaled using a diagonal matrix, or other scaling technique. In still further implementations, the local update can be determined using a linear term that forces each client device to update the parameters of the loss function in the same direction. In some implementations, the local model update can be determined by performing adaptive or non-adaptive optimization.

At (316), method (300) can include providing, by the client device, the local model update to the server. In some implementations, the local model update can be encoded prior to sending the local model or update to the server.

At (318), method (300) can include receiving, by the server, the local model update. In particular, the server can receive a plurality of local updates from a plurality of client devices.

At (320), method (300) can include again determining the global model. In particular, the global model can be determined based at least in part on the received local update(s). For instance, the received local updates can be aggregated to determine the global model. The aggregation can be an additive aggregation and/or an averaging aggregation. In particular implementations, the aggregation of the local updates can be proportional to the partition sizes of the data examples on the client devices. In further embodiments the aggregation of the local updates can be scaled on a per-coordinate basis. In some implementations, adaptive optimization or adaptive updating can be performed at 318.

Any number of iterations of local and global updates can be performed. That is, method (300) can be performed iteratively to update the global model based on locally stored training data over time.

Example Experimental Set Ups

Some example implementations of the present disclosure leverage an adaptive server optimizer, momentum, and learning rate decay to help improve convergence.

A naturally-arising client partitioning dataset can be highly representative of real-world federated learning problems. In particular, tasks may be performed on suitable datasets (e.g., CIFAR-100, EMNIST, Shakespeare, Stack Overflow, etc.). In some implementations, datasets may be image datasets (e.g., CIFAR-100, EMNIST, etc.) while in other implementations, datasets may be text datasets (Shakespeare, Stack Overflow, etc.). Any suitable task may be performed on a suitable dataset. For example, a CNN may be trained to do a character recognition on EMNIST (e.g., EMNIST CR) and a bottleneck autoencoder (e.g., EMNIST AE). As another example, an RNN may be trained for next-character-prediction on Shakespeare. As yet another example, tag prediction using logistic regression on bag-of-words vectors may be performed on Stack Overflow and/or an RNN to do next-word-prediction may be trained to Stack Overflow.

In some implementations, datasets can be partitioned into training and test sets. More particularly, each dataset can have their own set of clients. For example, CIFAR-100 can have 500 train clients; 50,000 train examples; 100 test clients; and 10,000 test examples. As another example, EMNIST-62 can have 3,400 train clients; 671,585 train examples; 3,400 test clients; and 77,483 test examples. As yet another example, Shakespeare can have 715 train clients; 16,068 train examples; 715 test clients; and 2,356 test examples. As yet another example, Stack Overflow can have 342,477 train clients; 135,818,730 train examples; 204,088 test clients; and 16,586,035 test examples.

In some implementations, algorithms may be implemented in TensorFlow Federated. More particularly, client sampling can be done uniformly at random from all training clients. Specifically, client sampling can be done without replacement within a given round, but with replacement across rounds.

In some implementations, rather than using a constant K local steps per client, E client epochs of training over each client's local dataset at each round can be done. Furthermore, in order to account for the varying number of gradient steps per client, a weighted average of the client outputs $\Delta_i^t$ can be taken according to the number of training samples of the client.

In some implementations, no momentum can be used on the client. Furthermore, a momentum parameter of either 0 or 0.9 may be used on the server. From here on the former will be referred to as FEDAVG and the latter as FEDAVGM. $\eta_l$, $\eta$, and $\tau$ can be selected by grid-search tuning. In particular, for FEDADAM and FEDYOGI, a momentum parameter of $\beta_1=0.9$ can be fixed. Even more particularly, a second moment parameter can be fixed of $\beta_2=0.99$. The number of clients per round sampled can change depending on the dataset. For example, for Stack Overflow NWP, 50 clients per round may be sampled. As another example, other tasks may sample 10 clients per round.

In some implementations the batch size can be fixed at a per-task level. Fixing the batch size can assist in avoiding conflating variables. Furthermore, when comparing centralized training to federated training, the same batch size can be used in both federated and centralized training. For example, the task CIFAR-100 can have a batch size of 20. As another example, the task EMNIST AE can have a batch size of 20. As yet another example, the task EMNIST CR can have a batch size of 20. As yet another example, the task Shakespeare can have a batch size of 4. As yet another example, the task StackOverflow LR can have a batch size of 100. As yet another example, the task StackOverflow NWP can have a batch size of 16.

Example Results

Performance can be measured on a validation set throughout training. Specifically, the number of communication rounds can be used as a proxy for wall-clock training time due to all the algorithms exchanging equal-sized objects between server and clients.

In some implementations, each optimizer can be run with E=1 local client epochs. In particular, $\eta_l$ and $\eta$ can be selected based on the average validation performance over the last 100 communication rounds. More specifically, $\eta_l$ and $\eta$ can be tuned to achieve the best performance on the last 100 communication rounds. However, these results may only hold when the client learning rate is small (e.g., $1/\sqrt{T}$, where T is the total number of communication rounds) or when the client learning rate is decayed over time.

Figure 3C:
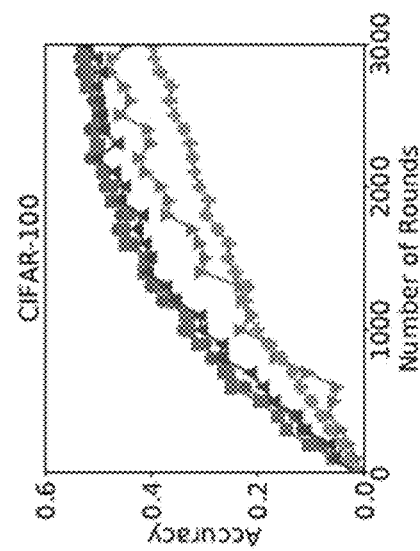
FIGS. 3A-F depict plots of example experimental results according to example embodiments of the present disclosure.
Figure 3B:
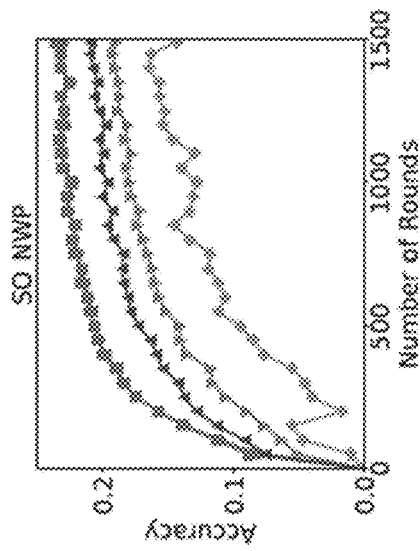
Figure 3A:
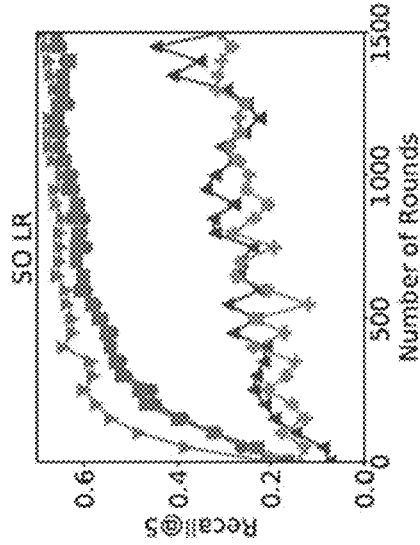

FIG. 3A illustrates the average validation performances over the last 100 rounds for Stack Overflow LR wherein average validation performance can be evaluated on recall at 5. Due to prohibitively large numbers in the Stack Overflow training datasets, 10,000 randomly selected examples consisted of the validation set. The average validation performance shown in FIG. 3A results in FEDADAGRAD having an average validation performance of around 0.68, FEDADAM having an average validation performance of around 0.66, FEDYOGI having an average validation performance of around 0.66, FEDAVGM having an average validation performance of around 0.36, and FEDAVG having an average validation performance of around 0.28. Additionally, a second evaluation was completed on the full test dataset. The full test dataset resulted in FEDADAGRAD having an average validation performance of around 0.66, FEDADAM having an average validation performance of around 0.64, FEDYOGI having an average validation performance of around 0.64, FEDAVGM having an average validation performance of around 0.32, and FEDAVG having an average validation performance of around 0.33.

FIG. 3B illustrates the average validation performances over the last 100 rounds for Stack Overflow NWP wherein average validation performance can be evaluated on percent accuracy. Due to prohibitively large numbers in the Stack Overflow training datasets, 10,000 randomly selected examples consisted of the validation set. The average validation performance shown in FIG. 3B results in FEDADAGRAD having an average validation performance of around 19.0%, FEDADAM having an average validation performance of around 23.4%, FEDYOGI having an average validation performance of around 23.5%, FEDAVGM having an average validation performance of around 21.0%, and FEDAVG having an average validation performance of around 15.6%. Additionally, a second evaluation was completed on the full test dataset. The full test dataset resulted in ADAGRAD having an average validation performance of around 20.3%, ADAM having an average validation performance of around 24.3%, YOGI having an average validation performance of around 24.4%, FEDAVGM having an average validation performance of around 22.3%, and FEDAVG having an average validation performance of around 17.3%.

FIG. 3C illustrates the average validation performances over the last 100 rounds for CIFAR-100 wherein average validation performance can be evaluated on percent accuracy. The average validation performance shown in FIG. 3C results in FEDADAGRAD having an average validation performance of around 47.2%, FEDADAM having an average validation performance of around 52.3%, FEDYOGI having an average validation performance of around 52.3%, FEDAVGM having an average validation performance of around 50.6%, and FEDAVG having an average validation performance of around 39.1%.

Figure 3F:
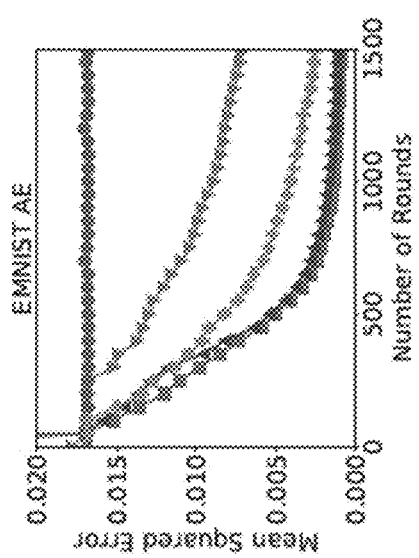
Figure 3E:
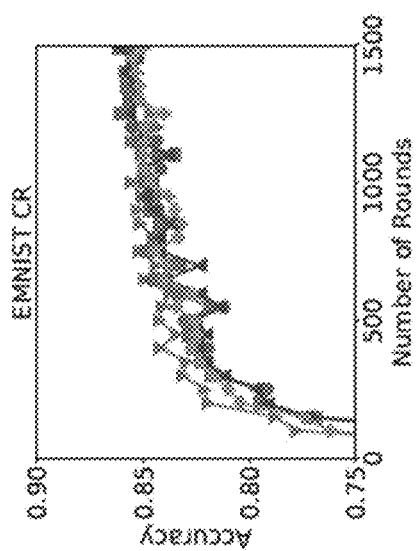
Figure 3D:
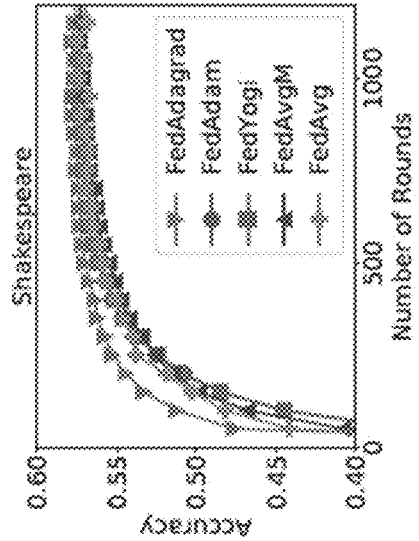

FIG. 3D illustrates the average validation performances over the last 100 rounds for Shakespeare wherein average validation performance can be evaluated on percent accuracy. The average validation performance shown in FIG. 3D results in FEDADAGRAD having an average validation performance of around 57.6%, FEDADAM having an average validation performance of around 57.2%, FEDYOGI having an average validation performance of around 57.3%, FEDAVGM having an average validation performance of around 57.3%, and FEDAVG having an average validation performance of around 57.0%.

FIG. 3E illustrates the average validation performances over the last 100 rounds for EMNIST CR wherein average validation performance can be evaluated on percent accuracy. The average validation performance shown in FIG. 1(e) results in FEDADAGRAD having an average validation performance of around 85.3%, FEDADAM having an average validation performance of around 85.5%, FEDYOGI having an average validation performance of around 85.6%, FEDAVGM having an average validation performance of around 85.6%, and FEDAVG having an average validation performance of around 84.8%.

FIG. 3F illustrates the average validation performances over the last 100 rounds for EMNIST CR wherein average validation performance can be evaluated on mean squared error. The average validation performance shown in FIG. 3F results in FEDADAGRAD having an average validation performance of around 7.21, FEDADAM having an average validation performance of around 16.8, FEDYOGI having an average validation performance of around 0.98, FEDAVGM having an average validation performance of around 1.20, and FEDAVG having an average validation performance of around 2.60.

In some implementations, text data can produce long-tailed feature distributions, often leading to approximately sparse gradients. In particular, adaptive optimizers can capitalize on sparse gradients. Specifically, the behavior has been observed for centralized training as well as FL. Even more specifically, both Stack Overflow tasks can exhibit such behavior although otherwise the two Stack Overflow tasks are different. For example, the Stack Overflow tasks are different in feature representation (e.g., bag-of-words vs. variable-length token sequence), model architecture (e.g., GLM vs. deep network), and optimization landscape (e.g., convex vs. non-convex).

In some implementations, words that do not appear in a client's set of examples can produce zero (e.g., for LR) or near-zero (e.g., for NWP, due to the softmax) client updates. In particular, the accumulator $v_{t,j}$ in Algorithm 2 can remain small for parameters tied to rare words. Thus, large updates can be allowed when they do occur. On the other hand, $v_{t,j}$ can grow quickly for common words. Thus, preventing the parameter pertaining to those words from oscillating. The intuition can be illustrated in FIGS. 3A-F, where adaptive optimizers outperform non-adaptive methods. Specifically, for the non-convex NWP task, momentum can be critical, whereas it can slightly hinder performance for the convex LR task.

In some implementations, the CIFAR-100, EMNIST AE/CR and Shakespeare results shown in FIGS. 3C-F lack the sparse-gradient structure of the two previous tasks described. In particular, for EMIST AE, the MSE can be normalized by the output dimension (e.g., 28×28 throughout). For EMNIST CR and Shakespeare, optimizers can perform well once suitably tuned. For CIFAR-100 and EMNIST AE, adaptive server optimizers and momentum can offer a substantial improvement over FEDAVG. Specifically, FEDYOGI can perform well in multiple settings. Even more particularly, FEDAVGM can be outperformed by FEDADAM and FEDYOGI on CIFAR-100. Furthermore, FEDADAM may not converge for any server/client learning rate combinations on EMNIST AE. Even more specifically, the bottleneck architecture used can create saddle points that can be difficult to escape.

In some implementations, Theorem 1 illustrates an expectation of an inverse relationship between the client learning rate $\eta_l$ and the best corresponding server learning rate $\eta$. More particularly, if the client learning rate is large, the serve can account for drift by reducing its learning rate. The relationship described above is illustrated in FIGS. 4A-F. In particular, the inverse relationship can be because if the client uses a small learning rate, the server can compensate with a larger learning rate. Specifically, the compensation allows the server to make sufficient progress. On the other hand, if the client is using a large learning rate, it can stand to fit much more to its own local dataset. However, since clients may have different datasets, this can result in client drift, which can mar convergence. Thus, the server can compensate with a smaller learning rate. However, if a client learning rate is too small or too large, training instability can violate the trend.

Figure 4A:
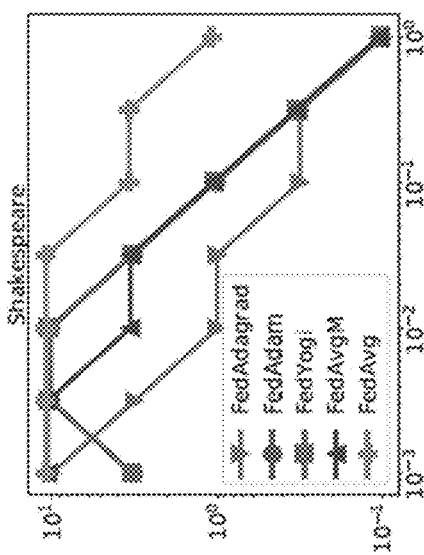
FIGS. 4A-F depict plots of example experimental results according to example embodiments of the present disclosure.

FIG. 4A illustrates the relationship between the client learning rate and the best corresponding server learning rate for Stack Overflow NWP. Wherein, the best corresponding server learning rate can be selected based on the average performance over the last 100 communication rounds. An inverse relationship between the client learning rate and the best corresponding server learning rate can be seen, particularly for FEDYOGI and FEDAVGM.

Figure 4B:
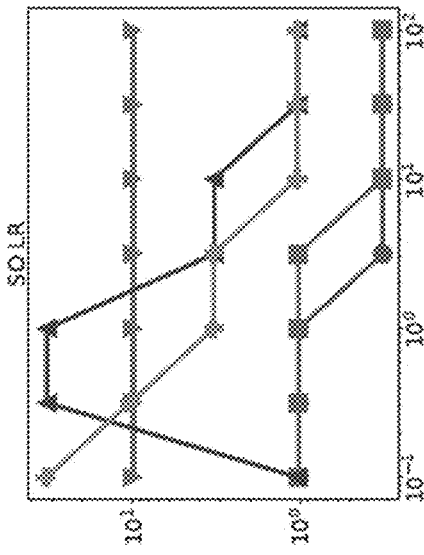

FIG. 4B illustrates the relationship between the client learning rate and the best corresponding server learning rate for Stack Overflow LR. Wherein, the best corresponding server learning rate can be selected based on the average performance over the last 100 communication rounds. An inverse relationship between the client learning rate and the best corresponding server learning rate can be seen, particularly for FEDYOGI and FEDAVGM.

Figure 4C:
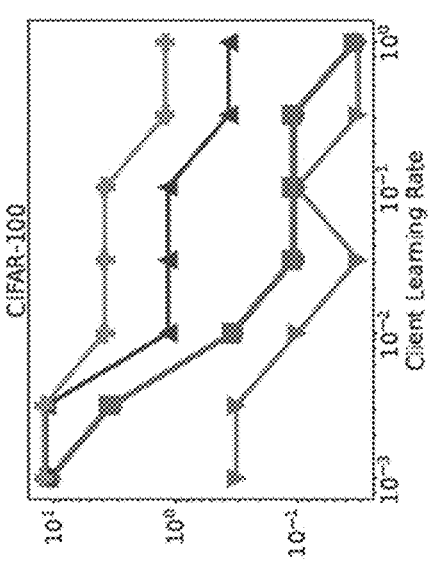

FIG. 4C illustrates the relationship between the client learning rate and the best corresponding server learning rate for Shakespeare. Wherein, the best corresponding server learning rate can be selected based on the average performance over the last 100 communication rounds. An inverse relationship between the client learning rate and the best corresponding server learning rate can be seen, particularly for FEDYOGI and FEDAVGM.

Figure 4D:
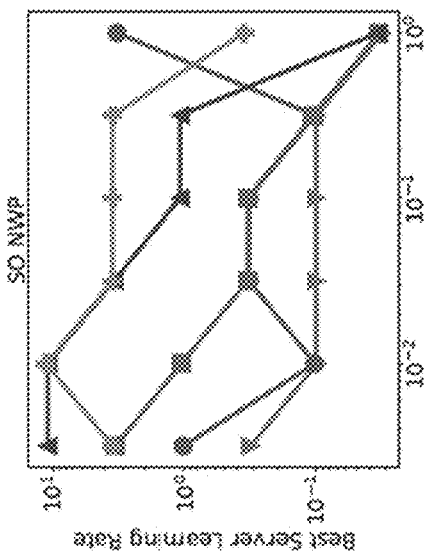

FIG. 4D illustrates the relationship between the client learning rate and the best corresponding server learning rate for EMNIST CR. Wherein, the best corresponding server learning rate can be selected based on the average performance over the last 100 communication rounds. An inverse relationship between the client learning rate and the best corresponding server learning rate can be seen, particularly for FEDYOGI and FEDAVGM.

Figure 4E:
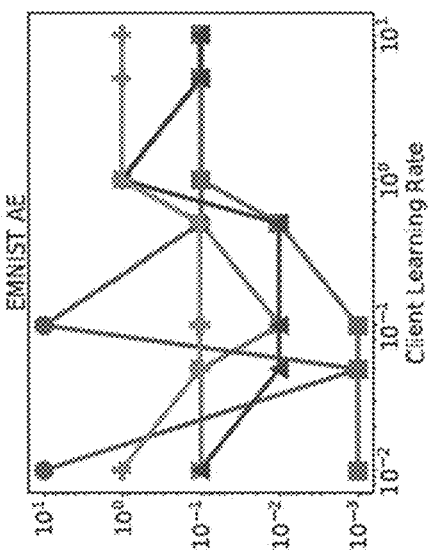

FIG. 4E illustrates the relationship between the client learning rate and the best corresponding server learning rate for EMNIST AE. Wherein, the best corresponding server learning rate can be selected based on the average performance over the last 100 communication rounds. An inverse relationship between the client learning rate and the best corresponding server learning rate is not as clear. This may be due to the primary obstacle in EMNIST AE being escaping saddle points.

Figure 4F:
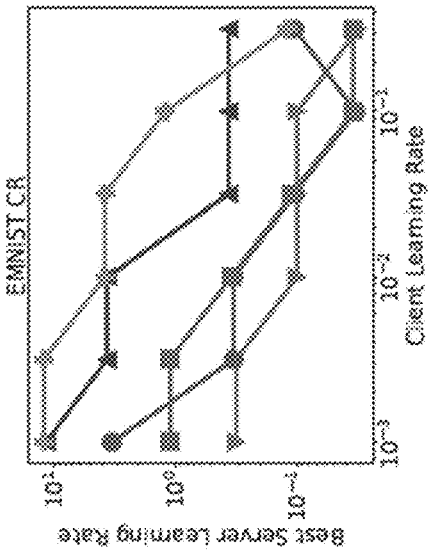

FIG. 4F illustrates the relationship between the client learning rate and the best corresponding server learning rate for CIFAR-100. Wherein, the best corresponding server learning rate can be selected based on the average performance over the last 100 communication rounds. An inverse relationship between the client learning rate and the best corresponding server learning rate can be seen, particularly for FEDYOGI and FEDAVGM.

In some implementations, the models can be trained in a centralized fashion on a shuffled version of the dataset. As a particular example, the EMNIST CR model can be trained for 100 epochs. Specifically, tuned learning rates for each centralized optimizer can be used. The EMNIST CR model with the centralized optimizer can achieve around 88.0% accuracy. In particular, the ADAGRAD centralized optimizer can achieve around 88.0% accuracy, the ADAM centralized optimizer can achieve around 87.9% accuracy, the YOGI centralized optimizer can achieve around 88.0% accuracy, the SGDM centralized optimizer can achieve around 87.7% accuracy, and the SGD centralized optimizer can achieve around 87.7% accuracy.

Furthermore, the average performances of the EMNIST CR task with the last 100 rounds of federated optimizers using three schedules for $\eta_l$ (1. constant, 2. inverse square root decay of $\eta_l/\sqrt{t}$, and 3. a staircase exponential decay schedule where $\eta_l$ can be decreased by a factor of 0.1 every 500 rounds), using E=10 client epochs and sampling 10 clients per round can be as follows: for FEDADAGRAD, 1. 85.3%; 2. 84.3%; and 3. 85.5%. For FEDADAM, 1. 85.5%; 2. 86.2%; and 3. 86.8%. For FEDYOGI, 1. 85.6%; 2. 85.7%; and 3. 86.8%. For FEDAVGM, 1. 85.6%; 2. 85.7%; and 3. 86.4%. For FEDAVG, 1. 84.8%; 2. 84.4%; and 3. 86.7%.

In some implementations, the staircase exponential decay schedule can improve the accuracy of optimizers. More particularly, the staircase exponential decay schedule can allow most optimizers to get close to the best centralized accuracy with a federated optimizer. Thus, there may be efficacy in using the staircase exponential decay schedule learning rate to compensate for deficiencies of vanilla FEDAVG.

In some implementations, the performance of adaptive optimizers (e.g., using the staircase exponential decay schedule) can be compared with vanilla FEDAVG (e.g., without using the staircase exponential decay schedule). More particularly, for FEDAVG, the number of local client epochs can be varied (e.g., over {1, 5, 10}). On the other hand, a number of (e.g., 10) local client epochs can be used for the adaptive optimizers.

Figure 5:
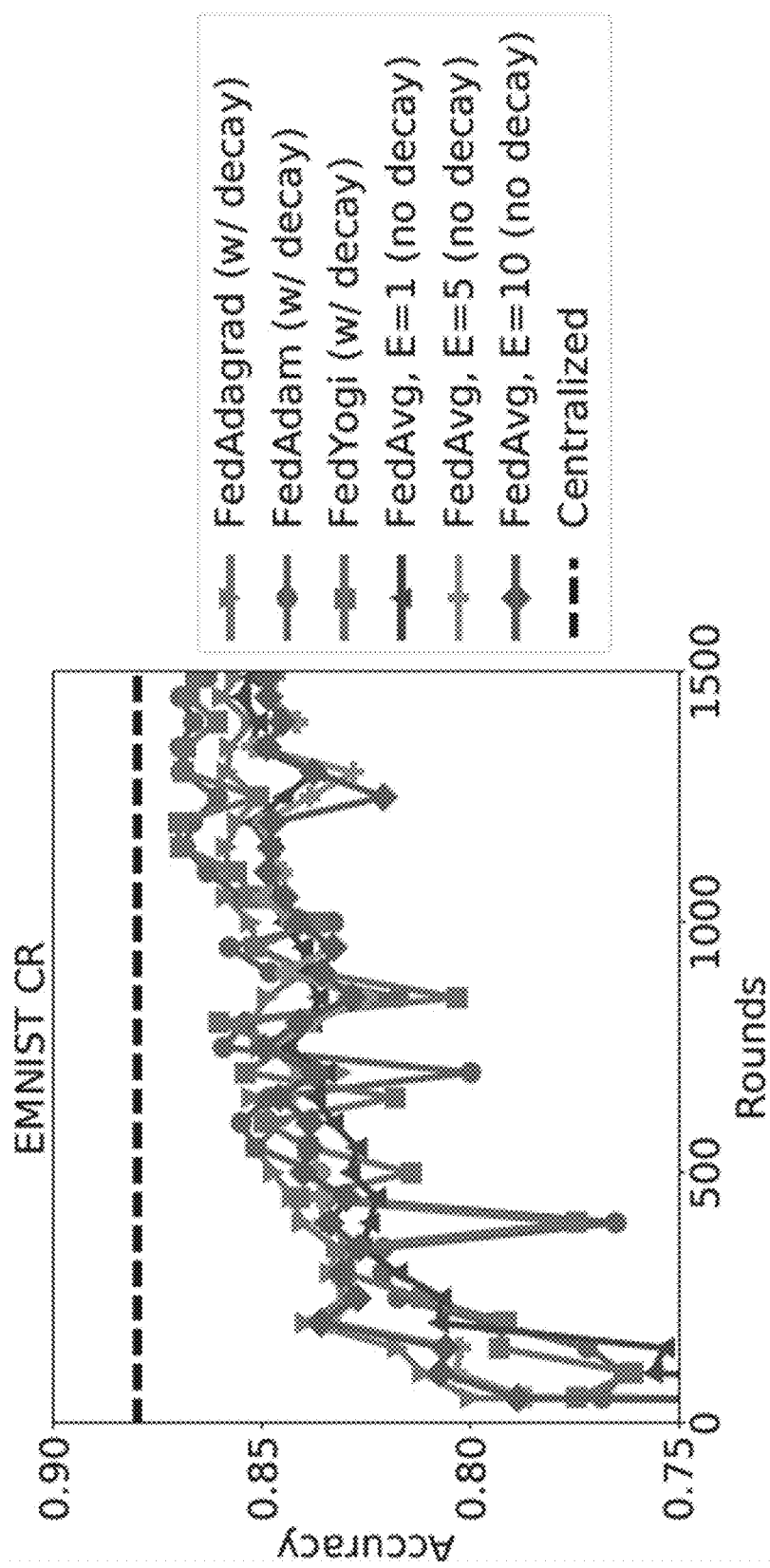
FIG. 5 depicts a plot of example experimental results according to example embodiments of the present disclosure.

FIG. 5 illustrates applying the comparative methods of above to the EMNIST CR task to measure the validation accuracy over time of various optimizers as well as the best centralized accuracy while using 10 clients per round. FIG. 5 shows that with E=10, good performance can be achieved initially. However, there may be slightly worse accuracy than E∈{1,5} after multiple rounds. On the other hand, adaptive optimizers with the staircase exponential decay schedule may surpass all three versions of FEDAVG presented after the second client learning rate decay occurs. Specifically, the adaptive optimizers with the staircase exponential decay schedule may continue to perform better thereafter.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform adaptive optimization of a machine-learned model in a federated learning setting, the method comprising:
   at each of a plurality of training iterations:
      receiving, by a server computing system comprising one or more server computing devices, a plurality of client model updates to the machine-learned model respectively from a plurality of client computing devices, the client model update received from each client computing device generated by performance by the client computing device of a client optimization of a local version of the machine-learned model on one or more training examples stored at the client computing device;
      determining, by the server computing system, an aggregate client model update from the plurality of client model updates; and
      performing, by the server computing system, an adaptive server optimization on the aggregate client model update to generate an updated global version of the machine-learned model;
      wherein performing, by the server computing system, the adaptive server optimization comprises adaptively determining, by the server computing system, a current effective learning rate applied at the current training iteration based at least in part on one or more past aggregate client model updates determined in one or more past training iterations; and
      wherein, at each of the plurality of training iterations, adaptively determining, by the server computing system, the current effective learning rate applied at the current training iteration comprises dividing, by the server computing device, a current learning rate by a square root of a current learning rate control value.

2. The computer-implemented method of claim 1, wherein each client model update comprises a set of model difference values describing differences in model parameter values of parameters of the local version of the machine-learned model resulting from performance by the client computing device of the client optimization.

3. The computer-implemented method of claim 1, wherein, at each of the plurality of training iterations, adaptively determining, by the server computing system, the current effective learning rate applied at the current training iteration comprises:
   determining, by the server computing system, the current learning rate control value based on the aggregate client model update, wherein the current learning rate control value equals a most recent learning rate control value plus a square of the aggregate client model update; and
   determining, by the server computing system, the current effective learning rate based at least in part on the current learning rate control value.

4. The computer-implemented method of claim 1, wherein, at each of the plurality of training iterations, adaptively determining, by the server computing system, the current effective learning rate applied at the current training iteration comprises:
   determining, by the server computing system, the current learning rate control value based on the aggregate client model update, wherein the current learning rate control value equals a most recent learning rate control value minus an update value, wherein the update value is equal to a square of the aggregate client model update multiplied by a sign function applied to the most recent learning rate control value minus the square of the aggregate client model update and multiplied by a scaling coefficient that is equal to one minus an update scaling parameter; and determining, by the server computing system, the current effective learning rate based at least in part on the current learning rate control value.

5. The computer-implemented method of claim 1, wherein, at each of the plurality of training iterations, adaptively determining, by the server computing system, the current effective learning rate applied at the current training iteration comprises:

determining, by the server computing system, the current learning rate control value based on the aggregate client model update, wherein the current learning rate control value equals a most recent learning rate control value times an update scaling parameter minus a square of the aggregate client model update times one minus the update scaling parameter; and determining, by the server computing system, the current effective learning rate based at least in part on the current learning rate control value.

6. The computer-implemented method of claim 1, wherein, dividing, by the server computing device, the current learning rate by the square root of the current learning rate control value comprises dividing, by the server computing device, the current learning rate by the square root of the current learning rate control value further plus an adaptivity control value.

7. The computer-implemented method of claim 1, wherein, at each training iteration, performing, by the server computing system, the adaptive server optimization on the aggregate client model update to generate the updated global version of the machine-learned model comprises setting the updated global version of the machine-learned model equal to a current global version of the machine-learned model plus a global update, wherein the global update comprises the current effective learning rate times the aggregate client model update, and optionally further times a current momentum value.

8. The computer-implemented method of claim 1, further comprising:

transmitting, by the server computing device, the updated global version of the machine-learned model to one or more of the plurality of client computing devices.

9. A computing system, comprising:
one or more processors; and
one or more non-transitory computer-readable media that store:
a machine-learned model that has been trained through performance of adaptive optimization in a federated learning setting, wherein the adaptive optimization comprises an adaptive server optimization performed by a server computing system on an aggregate client model update to generate an updated global version of the machine-learned model, wherein, at each of a plurality of training iterations, the adaptive server optimization comprises adaptive determination of a current effective learning rate applied at the training iteration based at least in part on one or more past aggregate client model updates determined in one or more past training iterations, and wherein, at each of the plurality of training iterations, adaptive determination of the current effective learning rate applied at the current training iteration comprises dividing a current learning rate by a square root of a current learning rate control value optionally further plus an adaptivity control value; and instructions that, when executed by the one or more processors, cause the computing system to employ the machine-learned model to generate predictions based on input data.

10. The computing system of claim 9, wherein, at each training iteration:

the aggregate client model update is based on a plurality of client model updates respectively received by the server computing system from a plurality of client computing devices; and each client model update comprises a set of model difference values describing differences in model parameter values of parameters of a local version of the machine-learned model resulting from performance by the client computing device of a client optimization of the local version of the machine-learned model on one or more training examples stored at the client computing device.

11. The computing system of claim 9, wherein, at each training iteration, adaptive determination of the current effective learning rate comprises:

determination of the current learning rate control value based on the aggregate client model update, wherein the current learning rate control value equals a most recent learning rate control value plus a square of the aggregate client model update; and determination of the current effective learning rate based at least in part on the current learning rate control value.

12. The computing system of claim 9, wherein, at each training iteration, adaptive determination of the current effective learning rate comprises:

determination of the current learning rate control value based on the aggregate client model update, wherein the current learning rate control value equals a most recent learning rate control value minus an update value, wherein the update value is equal to a square of the aggregate client model update multiplied by a sign function applied to the most recent learning rate control value minus the square of the aggregate client model update and multiplied by a scaling coefficient that is equal to one minus an update scaling parameter; and determination of the current effective learning rate based at least in part on the current learning rate control value.

13. The computing system of claim 9, wherein, at each training iteration, adaptive determination of the current effective learning rate comprises:

determination of the current learning rate control value based on the aggregate client model update, wherein the current learning rate control value equals a most recent learning rate control value times an update scaling parameter minus a square of the aggregate client model update times one minus the update scaling parameter; and determination of the current effective learning rate based at least in part on the current learning rate control value.

14. A client computing device configured to perform adaptive optimization of a machine-learned model in a federated learning setting, the client device comprising:
one or more processors; and
one or more non-transitory computer-readable media that store instructions that, when executed by the one or more processors, cause the client computing device to perform operations, the operations comprising:
for each of a plurality of training operations:
performing a client optimization of a local version of a machine-learned model on one or more training examples stored at the client computing device to generate a client model update;
transmitting the client model update to a server computing system that performs an adaptive server optimization on an aggregate client model update derived from the client model update to generate an updated global version of the machine-learned model, wherein, at each training iteration, the adaptive server optimization comprises adaptive determination of a current effective learning rate applied at the training iteration based at least in part on one or more past aggregate client model updates determined in one or more past training iterations, and wherein, at each of the plurality of training iterations, adaptive determination of the current effective learning rate comprises dividing a current learning rate by a square root of a current learning rate control value optionally plus an adaptivity control value; and
receiving the updated global version of the machine-learned model from the server computing system.

15. The client computing device of claim 14, wherein, at each training iteration, adaptive determination of the current effective learning rate comprises:
determination of the current learning rate control value based on the aggregate client model update, wherein the current learning rate control value equals a most recent learning rate control value plus a square of the aggregate client model update; and
determination of the current effective learning rate based at least in part on the current learning rate control value.

16. The client computing device of claim 14, wherein, at each training iteration, adaptive determination of the current effective learning rate comprises:
determination of the current learning rate control value based on the aggregate client model update, wherein the current learning rate control value equals a most recent learning rate control value minus an update value, wherein the update value is equal to a square of the aggregate client model update multiplied by a sign function applied to the most recent learning rate control value minus the square of the aggregate client model update and multiplied by a scaling coefficient that is equal to one minus an update scaling parameter; and
determination of the current effective learning rate based at least in part on the current learning rate control value.

17. The client computing device of claim 14, wherein, at each training iteration, adaptive determination of the current effective learning rate comprises:
determination of the current learning rate control value based on the aggregate client model update, wherein the current learning rate control value equals a most recent learning rate control value times an update scaling parameter minus a square of the aggregate client model update times one minus the update scaling parameter; and
determination of the current effective learning rate based at least in part on the current learning rate control value.

* * * * *